US012661795B2

(12) United States Patent
Morris-Downing et al.

(10) Patent No.: US 12,661,795 B2
(45) Date of Patent: Jun. 23, 2026

(54) PACKING AND PLANNING FOR TIGHT INCOLLAPSIBLE LOADS

(71) Applicant: Dexterity, Inc., Redwood City, CA (US)

(72) Inventors: Talbot Morris-Downing, Redwood City, CA (US); Zhouwen Sun, San Mateo, CA (US)

(73) Assignee: Dexterity, Inc., Redwood City, CA (US)

( * ) Notice: Subject to any disclaimer, the term of this patent is extended or adjusted under 35 U.S.C. 154(b) by 635 days.

(21) Appl. No.: 18/101,292

(22) Filed: Jan. 25, 2023

(65) Prior Publication Data

US 2023/0241777 A1 Aug. 3, 2023

Related U.S. Application Data

(60) Provisional application No. 63/305,195, filed on Jan. 31, 2022.

(51) Int. Cl.
B25J 9/16 (2006.01)

(52) U.S. Cl.
CPC .................................. B25J 9/1687 (2013.01)

(58) Field of Classification Search
CPC ........ B25J 9/1687; B25J 9/163; B25J 9/1697; G05B 2219/39102; G05B 2219/40
See application file for complete search history.

(56) References Cited

U.S. PATENT DOCUMENTS 9,238,304 B1 * 1/2016 Bradski .................... B25J 9/162
9,315,344 B1 * 4/2016 Lehmann ............... B65G 61/00

9,688,489 B1 6/2017 Zevenbergen
9,884,734 B1 2/2018 Garner
10,618,172 B1 * 4/2020 Diankov ................ B25J 9/1676
10,984,378 B1 * 4/2021 Eckman ........... G06K 19/06131
11,142,342 B2 * 10/2021 Podnar .................... B64F 1/368
2003/0116484 A1 6/2003 Takizawa (Continued)

FOREIGN PATENT DOCUMENTS

CN 105858188 A * 8/2016 ............ B25J 9/1694
CN 112009923 12/2020

(Continued)

OTHER PUBLICATIONS

PCT/US2023/011509 (Year: 2024).*

(Continued)

*Primary Examiner* — Jacob S. Scott
*Assistant Examiner* — Erin Morris
(74) *Attorney, Agent, or Firm* — Van Pelt, Yi & James LLP

(57) ABSTRACT

The present application discloses a method, system, and computer system for determining an arrangement of a set of objects for loading to a transport container. The method includes (i) receiving an indication of the set of objects to be loaded into the transport container for transport from a source location to a destination location, (ii) determining, based at least in part on object information corresponding to the set of objects, an arrangement of the set of objects loaded into the transport container according to a stability model, and (iii) providing the arrangement of the set of objects to a robotic system to implement in connection with loading the set of objects to the transport container.

18 Claims, 22 Drawing Sheets

(56) References Cited

U.S. PATENT DOCUMENTS

| | | | |
|---|---|---|---|
| 2007/0156255 A1 | 7/2007 | Herrmann | |
| 2009/0037245 A1 | 2/2009 | Gabrielson | |
| 2010/0222915 A1* | 9/2010 | Kuehnemann | G06Q 10/08 |
| | | | 706/14 |
| 2010/0316468 A1 | 12/2010 | Lert | |
| 2011/0137624 A1 | 6/2011 | Weisman | |
| 2012/0283868 A1 | 11/2012 | Rutt | |
| 2017/0183158 A1 | 6/2017 | Zhu | |
| 2018/0075402 A1 | 3/2018 | Stadie | |
| 2018/0194575 A1 | 7/2018 | Anderson | |
| 2020/0130935 A1 | 4/2020 | Wagner | |
| 2020/0242285 A1 | 7/2020 | Huang | |
| 2020/0247611 A1 | 8/2020 | Sharp | |
| 2020/0269429 A1 | 8/2020 | Chavez | |
| 2020/0316782 A1 | 10/2020 | Chavez | |
| 2020/0377315 A1 | 12/2020 | Diankov | |
| 2021/0019452 A1 | 1/2021 | Theobald | |
| 2021/0053699 A1 | 2/2021 | Carpenter | |
| 2021/0122046 A1 | 4/2021 | Sun | |
| 2021/0122590 A1 | 4/2021 | Garner | |
| 2021/0129334 A1 | 5/2021 | Kanunikov | |
| 2021/0133650 A1 | 5/2021 | Cella | |
| 2021/0158185 A1 | 5/2021 | Mcfarland | |
| 2021/0206587 A1* | 7/2021 | Chavez | B25J 9/1697 |
| 2021/0276807 A1* | 9/2021 | van Schijndel | B65G 1/1375 |
| 2021/0279831 A1 | 9/2021 | Moore | |
| 2022/0016977 A1 | 1/2022 | Shimomura | |
| 2023/0182315 A1* | 6/2023 | Merkle | B25J 9/1669 |
| | | | 700/259 |
| 2023/0241776 A1* | 8/2023 | Kuck | G06Q 10/083 |
| | | | 700/217 |
| 2023/0241777 A1 | 8/2023 | Morris-Downing | |

FOREIGN PATENT DOCUMENTS

| | | | |
|---|---|---|---|
| CN | 112589791 | 4/2021 | |
| CN | 121285506 A * | 1/2026 | B64F 1/324 |
| DE | 102020201683 | 8/2021 | |
| JP | H05116760 | 5/1993 | |
| JP | 2001122438 | 5/2001 | |
| JP | 2017165517 | 9/2017 | |
| JP | 2020064335 | 4/2020 | |
| JP | 2020172384 | 10/2020 | |
| JP | 2022521002 | 4/2022 | |
| TW | 201013554 | 4/2010 | |
| TW | M575565 | 3/2019 | |
| TW | 202137128 | 10/2021 | |
| WO | 2021160445 | 8/2021 | |
| WO | WO-2024040199 A2 * | 2/2024 | B25J 15/0616 |

OTHER PUBLICATIONS

Fromm et al., Physics-based damage-aware manipulation strategy planning using Scene Dynamics Anticipation, IEEE/RSJ International Conference on Intelligent Robots and Systems (IROS), Oct. 9-14, 2016, pp. 915-922.

* cited by examiner

290

291

292    293

"T" junction

294

375

400

430

600

700

900

1000

1200

Start

Receive an indication of a set of objects to be unloaded from a transport container ⌐1405

Determine a plan for unloading the set of objects from the transport container ⌐1410

Provide an indication of the plan as an output to be used in connection with unloading the various subsets of objects ⌐1415

More? ⌐1420

Yes

No

End

<u>1400</u>

PACKING AND PLANNING FOR TIGHT INCOLLAPSIBLE LOADS

CROSS REFERENCE TO OTHER APPLICATIONS

This application claims priority to U.S. Provisional Patent Application No. 63/305,195 entitled PACKING AND PLANNING FOR TIGHT INCOLLAPSIBLE LOADS filed Jan. 31, 2022 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of objects use strategies such as packing and unpacking dissimilar objects in boxes, crates, containers, conveyor belts, and on pallets, etc. Packing dissimilar objects in boxes, crates, on pallets, etc. enables the resulting sets of objects to be handled by heavy lifting equipment, such as forklifts, cranes, etc., and enables objects to be packed more efficiently for storage (e.g., in a warehouse) and/or shipment (e.g., in truck, cargo hold, etc.).

In some contexts, objects may be so dissimilar in size, weight, density, bulkiness, rigidity, strength of packaging, etc. that any given object or set of objects may or may not have attributes that would enable those objects to support the size, weight, distribution of weight, etc., of a given other object that might be required to be packed (e.g., in a box, container, pallet, etc.). When loading a transport container with a set of dissimilar objects, objects must be selected and loaded carefully to ensure the objects within the transport container does not collapse, lean, or otherwise become unstable (and to avoid object damage.

Use of robotics is made more challenging in many environments due to the variety of objects, variations in the order, number, and mix of objects to be packed, on a given pallet for example, and a variety of types and location of container and/or feed mechanism from which objects must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
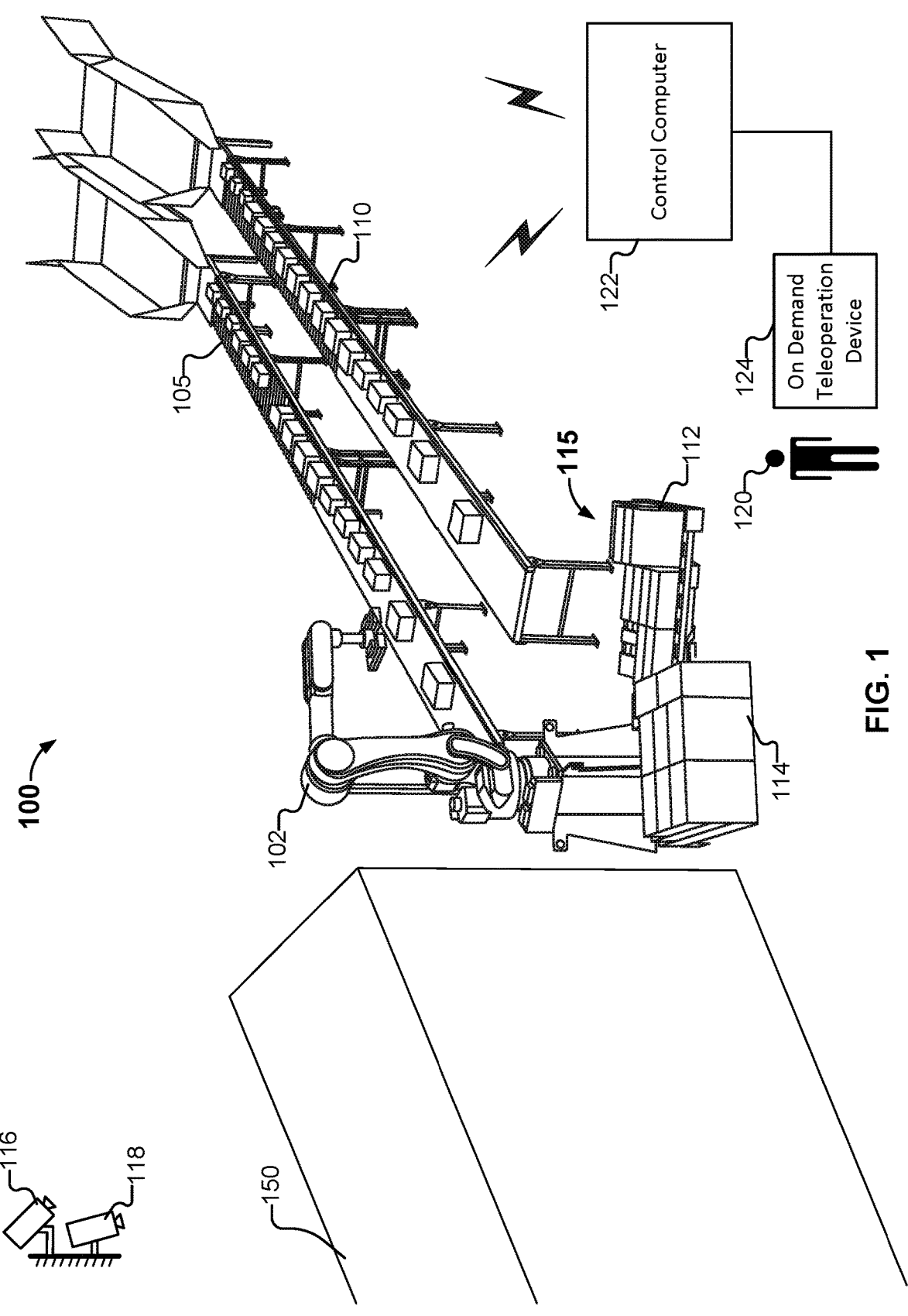
FIG. 1 is a diagram illustrating a robotic system to load objects to a transport container according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of objects on the pallet), any combination of the foregoing, and/or a sensor array comprising a plurality of sensors of the foregoing, etc. An example of a vision system is further described in U.S. patent application Ser. No. 16/667,661, the entirety of which is hereby incorporated herein for all purposes.

As used herein, a transport container includes a shipping container, an intermodal container, a cargo bay in a vehicle such as a truck, a truck bed, etc. In some embodiments, various other types of physically constrained space may be deemed a transport container for purposes herein.

Loading a set of objects to one or more transport containers is a computationally expensive operation because of the extremely large number of permutations or combinations for allocating objects to a particular transport container and for arranging a set of objects into the particular transport container. Certain loadings (e.g., arrangements) of objects into a particular transport container are more desirable than other loadings because the stability of the various loadings may differ (e.g., which may cause objects to fall, objects to become damaged, unsafe transport because of shifts in weight distribution during transport, etc.), because the density of the loadings impacts the number of transport containers required to transport the set of objects, or various other criteria for desirable/best loadings. Pallets and truck loads (or other loaded vehicles/containers) may be unstable if not packed carefully and intentionally. Shifting objects may complicate transport, damage objects, and/or complicate unloading. To operate autonomously, robotic system used to load a set of objects must be configured to pack the set objects tightly and securely.

Various embodiments use one or more models to optimize loadings of the set of objects, or otherwise select a best loading of the set of objects. In some embodiments, the system determines/selects a best loading of the set of objects within one or more predefined constraints. Examples of the one or more predefined constraints include (i) a time to compute/determine the particular loading of the set of objects to the one or more transport containers, (ii) a robotic system resource constraint (e.g., a number of robots that can be used to load the set of objects, a movement constraint by the robots, etc.), (iii) a constraint imposed by the dimensions of the transport container to which the set of objects are to be loaded, (iv) a weight distribution constraint (e.g., to eliminate loadings that are deemed unsafe or unstable), (v)

a scoring constraint based on a predefined scoring function (e.g., a function that measures a goodness of one or more characteristics of the loading, such as density, stability, etc.), (vi) a buffer zone constraint (e.g., that constrains the extent to which objects may be buffered in connection with resequencing the objects), etc. Various other constraints may be implemented.

Determining the manner to load a set of objects into one or more transport containers generally takes a significant amount of time, such as in connection with simulating various possible loadings. Various embodiments implement a time constraint on the determination/selection of the loading. In some embodiments, the system determines the loading (e.g., arrangement, etc.) based on a determination that a scoring of the loading according to a predefined scoring function exceeds a predefined scoring threshold. For example, the system selects the first evaluated loading that has a satisfactory scoring, such as in order to quickly determine a loading that is "good-enough". In some embodiments, the system iteratively evaluates potential loadings, and after a predefined time threshold has expired, the system determines the loading associated with a highest scoring among the set of evaluated loading and uses such a loading in connection with providing a plan of the loading as an output for loading the set of objects in the one or more transport containers. Various embodiments implement different time constraints in connection with determining an optimal/best arrangements. For example, a cloud service may run overnight (or extended period of time) to comprehensively evaluating various arrangements, etc. As another example, a local computer system may run a quick evaluation of arrangements in connection with determining an optimal/best/ideal arrangement in real-time or synchronous with loading of the set of objects to the transport container. For example, as a robotic system is loading a set of objects, the robotic system may query the system for an updated arrangement, such as in response to determining that a current context of the workspace is different from the context expected during simulation and evaluation by a cloud service or remote server that evaluated various arrangements over a longer period of time. The system may implement a lightweight model for evaluating arrangements and selecting an arrangement to be implemented in real-time with the loading. The lightweight model may use a set of predefined heuristics to determine an arrangement that is expected to be acceptable/feasible (e.g., expected to satisfy one or more predefined criteria or constraints).

Various embodiments include a system, method, and/or device for determining an arrangement for loading a set of objects into a transport container. The method includes (i) receiving an indication of the set of objects to be loaded into the transport container for transport from a source location to a destination location, (ii) determining, based at least in part on object information corresponding to the set of objects, an arrangement of the set of objects loaded into the transport container according to a stability model, and (iii) providing the arrangement of the set of objects to a robotic system to implement in connection with loading the set of objects to the transport container.

Examples of challenges associated with partitioning that are overcome by various embodiments include:

Computational complexity: the number of partitioning of the input set of objects is combinatorially large, thereby making exact optimization computationally intractable.

Safety: objects should be safely loaded into each transport container and safely transported. The safety constraint may include human personnel safety (e.g., loading helpers and truck drivers, etc.) and object safety (e.g., damage avoidance during load, transport, and unload).

Time: the determining of an arrangement is to be performed within a fixed time limit. As an example, the loading of a set of objects according to an arrangement is to be executable in a shipping facility within a fixed time and subject to storage, layout, and routing hardware constraints. As another example, the loading of the set of objects according to the arrangement are to be loaded within a fixed amount of time.

Cost: operational costs of executing loading a set of objects according to an arrangement and transport of the transport container should be minimized, or below a predefined cost threshold.

Personnel and hardware: people and hardware used to load objects into transport containers may differ between truck bays or shipping facilities, etc.

In various embodiments, a robotic loading system as disclosed herein uses knowledge of the incoming objects (e.g., boxes, etc.) and the scene or workspace (e.g., the loading area, the transport vehicle, the transport container, an interior of the transport container, a packing or arrangement resulting from a previous object placement) to stack or otherwise arrange objects in a stable configuration.

In various embodiments, a robotic loading system as disclosed herein includes a planner/controller (e.g., a controller that implements a placement module for determining placements or arrangements) that does one or more of the following:

Generally tries to form "T" junctions among items by placing one object on top of at least two other objects.

Generally avoids placing same (or similar) sized objects directly on top of one another, which could result in a stack or column instability among the arrangement within a transport container, etc.

Utilizes walls of the transport container (or truck in which the objects are to be loaded) to pack objects tightly wall to wall, which prevents the objects from moving during transport.

Rearranges objects as deemed necessary to improve stability of the load.

According to various embodiments, arranging a set of objects to include "T" junctions among the objects is more stable than stacking the objects one on top of another. In some embodiments, a robotic system (e.g., a robotic loading or unloading system) is configured to plan or re-plan loading of a set of objects. For example, the robotic system plans/re-plans an arrangement of the set of objects as required to favor stable "T" junctions over vertically aligned stacks. The robotic system may be required to re-plan an arrangement if an order in which objects expected to arrive to the workspace, or a set of objects differs from an expected set of objects based on which the initial plan was determined.

In some embodiments, the system implements a simulation of loading or arranging a set of objects. For example, the simulation is implemented in connection with anticipating less stable arrangements. The system uses computer vision and/or forced based sensing in connection with detecting less stable configurations. In response to detecting a less stable configuration (e.g., a stability less than a predefined stability threshold), the system initiates/performs a correction to address the instability issues. For example, the system moves one or more objects expected to be causing the instability to obtain an arrangement that satisfies the stability criteria (e.g., a stability exceeding a predefined stability threshold).

In some embodiments, the system loads objects within the transport container so that the objects are pressed wall-to-wall in the transport container (e.g., side-wall to side-wall). The secure packing of objects to be pressed wall-to-wall increases the stability. For example, by packing the set of objects for the objects to engage the walls of the transport container for a particular layer of objects, objects within the layer have less degrees of freedom from which forces acting on the objects may cause the objects to fall or shift. The robotic system (e.g., a robotic loading or unloading system) is configured to load a transport container from a deepest (e.g., farthest in) point first, and successively backing out of the transport container and placing objects at a next deepest point. For each successive layer of objects, objects may be loaded along the walls first, and the robotic system then works to place objects to the inside of the layer (e.g., between the objects along the walls). The robotic system loads the objects between the objects along the wall to ensure a snug packing against the walls. In some embodiments, robotic arms are used to apply force on objects to hold one or more objects against the walls as other objects are loaded to the insider (e.g., using a different robotic arm or different robotic system, which may be controlled in coordination with the robotic arms holding the objects against the walls). Suction or other side grippers may be used to hold objects against the walls and/or to slide last boxes into the remaining gap in the layer of objects (e.g., near the centerline of the transport container) to create a snug fit of objects within the layer.

In some embodiments, the system unloads in a substantially reverse order from the order by which the objects were loaded to the transport container. For example, the system begins removing objects from a layer of objects in the transport container. The unloading the objects from a particular layer includes first removing objects towards the middle (e.g., centerline of the transport container) and successively removing objects closer to the walls until the objects against the walls are removed. The system then iteratively performs the unloading sequence at a deeper point in the transport container until the unloading of the set of objects to be unloaded is completed. In some embodiments, the system implements computer vision to obtain a model of the loading of objects in the transport container. The system creates a segmented (e.g., object-by-object) view of the scene/workspace (e.g., the transport container) and determines a plan to unload the set of objects. The system determines the plant to unload the set of objects, taking in to consideration the need to avoid removing objects (e.g., boxes) in an order that is expected to result in a potentially unstable configuration for the remaining objects. The robotic system may use robotic arms to prevent remaining objects from toppling as other objects are removed (e.g., objects towards the sides are engaged to provide support and prevent toppling, while objects towards the middle are removed).

FIG. 1 is a diagram illustrating a robotic system to load objects to a transport container according to various embodiments. In some embodiments, system 100 is implemented at least in part by process 600 of FIG. 6, process 700 of FIG. 7, process 800 of FIG. 8, process 900 of FIG. 9, process 1000 of FIG. 10, process 1100 of FIG. 11, process 1100 of FIG. 12, process 1300 of FIG. 13, process 1400 of FIG. 14.

In the example shown, system 100 includes a robotic arm 102. In this example the robotic arm 102 is stationary, but in various alternative embodiments, robotic arm 102 may be a fully or partly mobile, e.g., mounted on a rail, fully mobile on a motorized chassis, etc. In other implementations, system 100 may include a plurality of robotic arms with a workspace. As shown, robotic arm 102 is used to pick various objects (e.g., arbitrary and/or dissimilar objects) from one or more conveyors (or other source) 110 and 105 in connection with loading the objects to transport container 150, or to pick objects from transport container 150 and placing the objects on one or more conveyors in connection with unloading transport container 150. In some embodiments, other robots not shown in FIG. 1 may be used to load pallets of objects to be loaded/unloaded into transport container 150, to push pallets or trays of objects to the workspace of robotic arm 102 for loading/unloading to transport container 150, etc.

As illustrated in FIG. 1, system 100 may comprise one or more predefined zones. For example, pallet 112, pallet 11 are shown as located within buffer zone 115. In some embodiments, one of the predefined zones is used as a buffer or staging area in which objects are temporarily stored (e.g., such as temporary storage until the object is to be loaded to transport container 150 in connection with loading objects to transport container 150 or loaded to conveyors 105 and/or 110 in connection with unloading objects from transport container 150). As illustrated in FIG. 1, buffer zone 115 may comprise one or more containers or pallets to hold objects for buffering/staging during loading/unloading. The predefined zone(s) may be denoted by marking or labelling on the ground or otherwise structurally such as via the frame shown in system 100. Each of the predefined zones (e.g., buffer zones) may be located within range of robotic arm 102 (e.g., such that robotic arm 102 can place, objects in the buffer zone and/or pick objects from the buffer zone, etc.). For example, the predefined zones are be located radially around robotic arm 102.

One or more objects are provided (e.g., carried) to the workspace of robotic arm 102 (or carried from the workspace) such as via conveyor 110 and/or conveyor 105. Various other mechanisms may be implemented to deliver objects to the workspace, such as use of various other robotic systems. System 100 controls operation of conveyors 105, 110, such as by control a speed, a direction of operation, etc. As an example, system 100 is configured to control the speed of conveyor 105 independently of the speed of conveyor 110, or system 100 control the speeds of both conveyor 105 and/or conveyor 110. Controlling the conveyors 105, 110 may include pausing the conveyor(s) (e.g., to allow sufficient time for robotic arm 102 to pick and place the objects). In some embodiments, conveyor 105 and/or conveyor 110 carries objects for one or more manifests (e.g., orders), or one or more sets of objects that are to be respectively loaded into different transport containers. For example, conveyor 105 and conveyor 110 may carry objects for a same manifest and/or different manifests.

System 100 controls robotic arm 102 to perform pick and place operations with respect to objects in the workspace such as to load an object to transport container 150, to unload an object from transport container 150, to move an object to buffer zone 115, etc. For example, system 100 controls robotic arm 102 to pick an object from a conveyor such as conveyor 110 or conveyor 105 and place the item o in transport container 150. System 100 controls robotic arm 102 (e.g., via control computer 122) to pick the object and move the object to a corresponding destination location (e.g., a location within transport container 150) based at least in part on a plan associated with the object or a plan associated with loading/unloading a set of objects to/from a particular transport container.

In some embodiments, determining the plan associated with loading/unloading a set of objects to/from one or more transport containers includes one or more of (i) determining an arrangement of the objects according to which the objects are to be loaded in the transport container, (ii) simulating a loading of one or more objects to a transport container, (iii) simulating a transport of the transport container (e.g., simulating forces that the transport container is expected to experience during transport, such as in connection with evaluating the stability or safety of a loading of objects in the transport container), and/or (iv) evaluating various possible arrangements (e.g., scoring based on a predefined scoring function(s) and selecting an arrangement to implement), etc. System 100 may determine an arrangement based at least in part on one or more heuristics, or based on querying a model, such as a machine learning model.

In some embodiments, system 100 determines the plan for loading/unloading a set of objects to/from a particular transport container offline or asynchronously with the loading/unloading of the transport container. For example, system 100 determines the plan for loading/unloading a set of objects to/from one or more transport containers by querying one or more servers (e.g., querying a cloud service) based at least in part on the set of objects. The one or more servers may determine the plan based on running a plurality of simulations of loading various objects to the transport container(s) and evaluating the loadings. The one or more servers may perform the simulations and evaluations of the various loadings and the determination of the plan for loading the set of objects offline, such as overnight or otherwise before the set of objects are provided to the workspace(s) of the robots (e.g., robotic arm 102).

System 100 may update the plan for loading/unloading the set of objects to/from one or more transport containers in real-time during while the set of objects are delivered to, or are disposed in, the workspace of the robots. For example, system 100 uses a lightweight model or one or more predefined heuristics to update the plan for loading/unloading the set of objects (e.g., the plan that was previously determined offline with the loading/unloading). System 100 uses control computer 122 to update the plan for loading/unloading the set of objects. The update to the plan for loading/unloading the set of objects may account for variations in one or more of (i) objects delivered to the workspace (e.g., malfunctioning may cause additional objects to be delivered or certain objects to be withheld from delivery, etc.), (ii) properties of objects delivered to the workspace (e.g., errors in the detection of object attributes), and/or (iii) an order in which objects are delivered to the workspace, etc.

In response to receiving the plan (e.g., from a server(s)) system 100 determines a strategy for performing a pick and place operations with respect to the objects to be loaded to transport container 150. For example, determining the strategy includes determining a manner by which to grasp the object, a trajectory of the object, a movement of the robot, and a manner by which the object is released, etc.

In some embodiments, system 100 determines an update to the plan associated with the object while the object is on the conveyors 105, 110, upon picking up the object (e.g., based on an obtained attribute of the object such as weight, or in response to information obtained by a sensor in the workspace such as an indication of an expected collision with another object or human, etc.), and/or during placement of the object (e.g., the system may use force sensors to detect instabilities, etc. before/after releasing the object).

System 100 may obtain an identifier associated with the object such as a barcode, QR code, or other identifier or information on the object. For example, system 100 scans/ obtains the identifier as the object is carried on the conveyor. In response to obtaining the identifier, system 100 uses the identifier in connection with determining the order in which the items are to be loaded to transport container 150, an arrangement of the object (e.g., destination location and/or orientation), a strategy for picking and placing the object, whether to re-sequence the objects such as based on staging the object in buffer zone 115, etc. In response to determining an arrangement of the object(s), system 100 determines a strategy, or determines whether to update the plan for loading the object to the transport container, based at least in part on a model or simulation of the loading of objects in transport container 150 and/or of a placing of the object in transport container 150. In connection with determining an arrangement for an object, system 100 determines a specific location at which the object is to be placed in transport container 150 or buffer zone 115. In addition, a plan for moving the object to the destination location may be determined, including a planned path or trajectory along which the object is to be moved. In some embodiments, the plan is updated as robotic arm 102 is moving the object such as in connection with performing an active measure to change or adapt to a detected state or condition associated with the one or more objects in the workspace (e.g., to avoid an expected collision event, to account for a measured weight of the object being greater than an expected weight, to reduce shear forces on the object as the object moved, etc.).

According to various embodiments, system 100 comprises a vision system. System 100 uses information captured by the vision system to determine a context of the scene/workplace, such as to generate a model for the workspace. System 100 may comprise one or more sensors and/or sensor arrays, such as cameras 116, 118. For example, system 100 includes one or more sensors within proximity of conveyor 105 and/or conveyor 110. The one or more sensors may obtain information associated with an object on the conveyor such as an identifier or information on the label of the object, or an attribute of the object such as dimensions of the object. In some embodiments, system 100 includes one or more sensors and/or sensor arrays that obtain information pertaining to a predefined zone and/or a pallet in the zone. For example, system 100 include a sensor that obtains information associated with buffer zone 115 and/or transport container 150. Sensors may include one or more 2D cameras, 3D (e.g., RGBD) cameras, infrared, and other sensors to generate a three-dimensional view of a workspace (or part of a workspace such as a pallet and stack of objects on the pallet). The information pertaining to buffer zone 115 and/or transport container 150 can be used in connection with determining a state of buffer zone and/or a loading of objects in transport container 150. As an example, system 100 generates a model of a loading of objects in transport container 150 based at least in part on the information pertaining to transport container 150 and information pertaining to at least part of the set of objects. System 100 in turns use the model in connection with determining/updating a plan for placing an object in transport container 150.

According to various embodiments, system 100 determines a plan for picking and placing an object (or updates the plan) based at least in part on a determination of a stability of objects loaded to transport container 150 or an expected stability of objects to be loaded to transport container 150. System 100 determines a model of the loading of objects in transport container 150, and system 100 uses the model in connection with determining/updating the plan for placing an object. As an example, if a next object to be moved is relatively large (e.g., such that a surface area of the object is large relative to a top surface of an object(s) on which the object relatively large object is to be placed in transport container 150), then system 100 may determine that placing the object in the planned destination location may cause the loading of objects in transport container 150 to become unstable (e.g., because the surface of the stack is non-planar). In contrast, system 100 may determine that placing the relatively large (e.g., planar) object at the planned destination location may result in a relatively loading (e.g., arrangement of objects in transport container 150). System 100 may determine that an expected stability of placing the object at the destination location is greater than a predetermined stability threshold, or that placement of the object at the destination location may result in an optimized placement of the object (e.g., at least with respect to stability).

In some embodiments, system 100 generates a model of a simulated loading or a loading of objects actually loaded to transport container 150 and determines whether the loading is expected to satisfy one or more predetermined stability criteria. Examples of the one or more predetermined stability criteria may include: (i) a number of "T" junctions among objects in the loading being less than a predefined "T" junction number threshold, (ii) a number of "T" junctions among objects in a layer of the loading (e.g., a vertical layer of objects, or a depth layer of objects) being less than a predefined layer "T" junction number threshold, (iii) a number of objects vertically stacked in the loading or a layer of the loading being less than a predefined vertical stacking threshold, (iv) a ratio of a number of "T" junctions to a number of objects being less than a predefined "T" junction ratio threshold, (v) a ratio of a number of "T" junctions to a number of non-"T" junctions being less than a predefined "T" junction: non-"T" junction ratio threshold, (vi) an expected stability being less than a predefined stability threshold, (vii) a scoring value for a set of objects according to a predefined scoring function (or predefined stability scoring threshold) being less than a predetermined scoring threshold, (viii) a density of objects being less than a predefined density threshold, (ix) a spacing between one or more objects being greater than a predefined spacing threshold. Various other stability criteria may be implemented.

System 100 may communicate a state of transport container 150 and/or operation of robotic arm 102 within a predefined zone. The state of transport container 150 and/or operation of robotic arm 102 may be communicated to a user or other human operator 120, such as human operator 120 (e.g., to provide a status of the loading/unloading of transport container, or to invoke human intervention to successfully complete a pick or place operation, etc.). For example, system 100 may include a communication interface (not shown) via which information pertaining to the state of system 100 (e.g., a state of transport container 150, a predetermined zone, a robotic arm, etc.) is communicated to a terminal such as on-demand teleoperation device 124 and/or a terminal used by a human operator.

According to various embodiments, system 100 uses information obtained by one or more sensors within the workspace to determine an abnormal state pertaining to transport container 150, such as an instability of objects loaded into transport container 150, or an identification of objects that have fallen from their respective destination locations. In response to detecting the abnormal state, the system communicates an indication of the abnormal state such as on-demand teleoperation device 124 or another terminal used by an operator. In addition to, or as an alternative to, notifying an operator of the abnormal state, system 100 performs an active measure in response to detecting the abnormal state. The active measure may include controlling the robotic arm 102 to at least partially correct the abnormal state (e.g., re-place fallen objects, realign the objects loaded into transport container 150, re-arranging objects, etc.). In some embodiments, the system performs the active measure to partially correct the abnormal state in response to determining that an extent of the abnormality is less than a threshold value. Examples of determining that an extent of the abnormality is less than a threshold value include (i) a determination that the misalignment of the object(s) is less than a threshold misalignment value, (ii) a determination that a number of dislodged, misplaced, or fallen objects is less than a threshold number, (iii) a determination that a size of a dislodged, misplaced, or fallen object satisfies a size threshold, etc.

A human operator may communicate with system 100 via a network such as a wired network and/or a wireless network. For example, system 100 may comprise a communication interface via which system 100 is connected to one or more networks. In some embodiments, a terminal connected via network to system 100 provides a user interface via which a human operator can provide instructions to system 100, and/or via which the human operator may obtain information pertaining to a state of system 100 (e.g., a state of the robotic arm, a state of a transport container 150, a state of a loading process for a particular manifest, etc.). The human operator may provide an instruction to system 100 via an input to the user interface. For example, a human operator may use the user interface to pause the robotic arm, pause a loading/unloading process with respect to a particular manifest, etc.

In various embodiments, elements of system 100 may be added, removed, swapped out, etc. In such an instance, a control computer initializes and registers the new element, performs operational tests, and begins/resumes loading/unloading operations, incorporating the newly added element, for example. Examples of elements may include conveyors, robotic arms, buffer zones, etc.

According to various embodiments, system 100 determines (e.g., computes, maintains, stores, etc.) an estimated state for transport container 150 and/or buffer zone 115. For example, system 100 determines a geometric model corresponding to the workspace and/or a loading of objects in transport container 150.

According to various embodiments, system 100 comprises a vision system comprising one or more sensors (e.g., sensor 240, sensor 241, etc.). In various embodiments, system 100 uses sensor data and geometric data (e.g., a geometric model) in connection with determining a location to place one or more objects in transport container 150 (or in connection with unloading one or more objects from transport container 150). System 100 uses different data sources to model the state of transport container 150 (or an arrangement/loading of objects in a transport container). For example, system 100 estimates locations of one or more objects in transport container 150 and one or more characteristics (or attributes) associated with the one or more objects (e.g., a size of the object(s)). Examples of the one or more characteristics associated with the one or more objects include an object size (e.g., dimensions of the object), a center of gravity, a rigidity of the object, a type of packaging, a deformability, a fragility (e.g., as indicated by fragile markers), a location of an identifier, etc.

System 100 determines the geometric model based at least in part on one or more attributes for one or more objects in the workspace. For example, the geometric model reflects respective attributes of a set of objects (e.g., one or more of a first set that are palletized/stacked, and a second set of objects that is to be palletized/stacked, etc.). Examples of an object include an object size (e.g., dimensions of the object), a center of gravity, a rigidity of the object, a type of packaging, a location of an identifier, a deformability of the object, a shape of the object, a fragility of the object, etc. Various other attributes of an object or object within the workspace may be implemented.

In some embodiments, system 100 generates a geometric model (e.g., an expected geometric model) of the workspace (e.g., a model of a loading of objects in transport container 150) based at least in part on simulated placements of objects. For example, the system simulates (e.g., inline or offline) the placement of a set of objects to transport container 150, generates a geometric model of the simulated placement(s), and evaluates the simulated loading (e.g., evaluates a stability of the loading). As another example, the system simulates (e.g., inline) a loading of a particular one or more objects, generates a geometric model based on an actual state of the workspace and the simulated placement(s), and evaluates the simulated placement(s) or an expected state of the loading in response to the simulated placement.

In some embodiments, system 100 generates the geometric model based at least in part on one or more objects that have been placed (e.g., objects for which system 100 controlled robotic arm 102 to place), one or more attributes respectively associated with at least a subset of the one or more objects, one or more objects within the workspace (e.g., predetermined objects such as a container in buffer zone 115, a robotic arm(s), a shelf system, a chute or other conveyance structure, or other infrastructure comprised in the workspace), etc. The geometric model can be determined based at least in part on running a physics engine on the control computer to model an arrangement of objects (e.g., models a state/stability of an arrangement of objects in transport container 150 or buffer zone 115, etc.). The geometric model is determined based at least in part on an expected interaction of various components of the workspace, such as an object with another object, an object, a simulated force applied to the transport container or objects within the transport container (e.g., to model the use of a forklift or other device to raise/move the transport container, to model the transport of the transport container, such as a model of a vehicle accelerating/decelerating during transport of the transport container), etc.

According to various embodiments, system 100 uses the geometric model and the sensor data to determine a best estimate of a state of the workspace or state of transport container 150. System 100 can adjust for (e.g., cancel) noise in one or more of the geometric models and/or sensor data. In some embodiments, system 100 detects anomalies or differences between a state according to the geometric model and a state according to the sensor data (e.g., sensor data obtained by the vision system). In response to determining an anomaly or difference between the geometric model and the sensor data, system 100 can make a best estimate of the state notwithstanding the anomaly or difference. For example, system 100 determines whether to use the geometric model or the sensor data, or a combination of (e.g., an interpolation between) the geometric model and the sensor data, etc. In some embodiments, system 100 determines the estimated state on a segment-by-segment basis (e.g., a voxel-by-voxel basis in the workspace, an object-by-object basis, or an object-by-object basis, etc.). For example, a first part of the workspace may be estimated using only the geometric model, a second part of the workspace may be estimated using only the sensor data (e.g., in the event of an anomaly in the geometric model), and/or a third part of the workspace may be estimated based on a combination of the geometric model and the sensor data. Using the example illustrated in FIG. 1, system 100 in connection with determining an aggregated estimated state may use only the geometric model to determine the individual estimated state for the objects loaded into transport container 150, use only sensor data to determine the individual estimated state for the workspace (e.g., a state of transport container 150 and/or buffer zone 115), and use a combination of the respective geometric model and sensor data for the objects loaded to the transport container.

System 100 is configured to determine or update a plan for loading a set of objects to transport container 150. The determining the plan for loading the set of objects includes one or more of (i) determining whether to partition the set of objects (e.g., for loading across a plurality of transport containers); (ii) partitioning the set of objects in response to determining to partition the set of objects; (iii) determining a sequence in which the objects are to be delivered to the workspace of system for loading the objects to transport container 150; (iv) determining an order in which robotic arm 102 is to load the objects to transport container 150; (v) determining an arrangement of the set of objects (e.g., placements for the objects, such as location and orientation, etc.).

In some embodiments, system 100 uses control computer 122 to determine a solution with respect to loading the set of objects. Control computer 122 is configured to provide a quick solution in real-time or synchronous with the control of robotic arm 102 to load the set of objects to transport container 150. For example, system 100 (e.g., control computer 122) stores a lightweight model (e.g., a machine learning model) or a set of one or more heuristics according to which system 100 determines a solution for loading the set of objects to transport container (e.g., a solution for arranging the objects in the transport container).

In some embodiments, system 100 queries one or more servers (not shown), such as a cloud service, to determine a plan for loading the set of objects. The one or more servers are configured to provide a solution that is generally more optimal than the solution otherwise provided by the lightweight model used to determine inline solutions (e.g., because the one or more servers have more robust compute capabilities and may not be as time-restricted). For example, the one or more servers have greater computational resources and are not as restricted with respect to time for determining the solution as the locally stored lightweight model. The one or more servers provide an offline service for determining a plan for loading a set of objects. For example, the one or more servers determine the plan asynchronous with respect to the loading of the objects to transport container 150. The one or more servers are configured to store/use a more robust model that provides solutions having higher fidelity than solutions obtained by querying the locally stored lightweight model. The lightweight model is configured to tradeoff higher fidelity for quicker computation of a solution for loading the set of objects.

In some embodiments, system 100 obtains from a cloud service a robust solution for loading the set of objects to transport container 150, and system 100 (e.g., control computer 122) queries the locally stored lightweight model based at least in part on variations of the state of the workspace in relation to the expected state of the workspace used by the cloud service to model the workspace and determine a solution. Examples of variations of the state of the workspace include: (i) different hardware constraints, such as absence of certain robots, different robotic system capabilities, or different configurations of the workspace in which the particular transport container are to be loaded, (ii) the objects are delivered to the workspace in an order different from an expected order used in determining the plan, (iii) one or more attributes of one or more objects is different from the attributes used in the modelling of the workspace to determine the plan. Various other variations may occur for which system 100 uses the locally stored lightweight model to update the plan for a more optimal plan of loading the set of items.

In some embodiments, system 100 implements a model for selecting an optimal or best solution for arranging the set of objects. As an example, the optimal or best solution is a best solution within a predefined amount of runtime. The optimal or best solution is selected based on a solution (e.g., an arrangement) having a highest scoring value according to a predetermined scoring function. For example, the solution having a highest scoring value is a solution having a highest stability. As another example, the solution having a scoring value that has an optimal balancing of various factors (e.g., stability, time to complete the loading or unloading, cost for completing the loading, time to complete a combination of the loading and unloading, etc.).

In some embodiments, various modules used in the model for evaluating a loading of a set of objects (e.g., to provide a good-enough or best solution for loading the set of objects) implement techniques to limit the solution space of potential solutions (e.g., potential arrangements, etc.). For example, a module implements a technique to narrow the solution space to include feasible solutions and potentially solutions that are nearly feasible. The module may implement one or more heuristics in connection with trimming the solution space, or may otherwise be trained (e.g., using machine learning processes) to quickly identify solutions that are expected to be deemed feasible (e.g., quickly exclude solutions that are expected to be deemed infeasible). For models that are to be implemented offline (e.g., to provide asynchronous evaluations for solutions for loading the set of objects), the modules are configured to trim the solution space to allow for more potential solutions to be evaluated (e.g., edge-case solutions are included in the potential solution space because the offline model is not as restricted with respect to computation resources or runtime to provide a feasible solution). In contrast, for models that are to be implemented inline (e.g., to provide synchronous/real-time solutions), the modules are configured to trim the solution space to generate a relatively narrower potential solution space. For example, the model used for inline evaluation of solutions trims the solution space to eliminate solutions that are expected to violate one or more predefined heuristics (e.g., heuristics that are found to result in solutions that are expected to be infeasible or having a scoring value less than a scoring value threshold). As another example, the model used for inline evaluation of solutions includes in the solution space solutions that satisfy one or more predefined heuristics (e.g., heuristics that are found to result in solutions that are expected to be feasible or having a scoring value higher than a scoring value threshold). In some embodiments, the one or more heuristics used in connection with defining the potential solution space (e.g., trimming the solution space to exclude solutions expected to be infeasible, or including in the solution space solutions expected to be feasible) are determined based at least in part on a machine learning process.

In some embodiments, the model and/or modules used in connection with the model are configured to leverage combinatorial optimization and/or machine learning to efficiently find a feasible solution and to iteratively refine/improve the solution.

In some embodiments, the model is configured to provide a feasible solution within a predefined period of time. For example, the model is configured to iteratively evaluate potential solutions and identify a feasible solution within the predefined period of time. As an example, in the case of a model implemented inline to provide a solution synchronous or in real-time with the loading of the objects, the predefined period of time is 5 seconds. As another example, in the case of a model implemented offline to provide an asynchronous solution, the predefined time is on the magnitude of hours, such as 5 hours, 12 hours, etc. If the model completes evaluation of the solution space before expiration of the predefined period of time, the model returns a best solution, such as a solution having a highest scoring value with respect to an evaluation using a predefined scoring function. If the model has not completed evaluation of the solution space before expiration of the predefined period of time and if the model has identified a set of one or more feasible solutions, the model returns a best solution among the one or more feasible solutions. If the model has not completed evaluation of the solution space before expiration of the predefined period of time and the model has not yet identified a set of one or more feasible solutions, the model may implement one or more heuristics to quickly provide a solution that is deemed likely to be feasible. Examples of heuristics may include loading heavy objects first, loading large objects first, arranging heavy or large objects to be near the bottom of the transport container (e.g., on the floor of the transport container or within the first set of rows of objects, etc.), buffering fragile or deformable objects (e.g., a fragility or deformability exceeding a corresponding predefined fragility threshold or deformability threshold), determining to load an object to form at least one "T" junction with other objects (e.g., in the event that the solution space for arranging the object includes solutions within which a "T" junction is formed and solutions within which the object is vertically on another object) or otherwise loading such objects towards the end of loading the transport container or loading such objects towards a top row of objects in the transport container, providing a bias towards selecting a placement that results in a "T" junction being formed over a placement in which no "T" junction is formed, etc. Various other heuristics may be implemented.

In some embodiments, the system (e.g., the partitioning module) selects the arrangement that has both (i) the highest score according to the predefined scoring function, and (ii) satisfies one or more feasible loading criteria. Examples of feasible loading criterion include: (a) maximum amount of time to load, unload, or collectively load and unload, (b) a minimum expected density of objects loaded to the transport container, (c) a minimum number of total objects loaded to the transport container, (d) a minimum stability of the subset of objects loaded to the transport container, (e) a weight distribution that satisfies one or more criteria such as weight being distributed at locations of transport container corresponding to the wheels of a truck that is expected to carry the transport container or otherwise at locations of transport container where the transport container is supported during transport, etc. Various other feasible loading criteria may be implemented. The one or more feasible loading criteria may be minimum requirements for a loading of a set of objects in order for the loading to be deemed feasible.

In some embodiments, the model bounds the solution space based on resources available for loading/unloading a set of objects. Examples of bounding include: (i) dimensional bounding based on the dimensions of a transport container in which the set of objects are expected to be loaded (e.g., different transport containers may have different dimensions or configurations (e.g., different types of doors or access capabilities for loading/unloading), (ii) one or more characteristics (e.g., capabilities, limitations, etc.) of a loading/unloading bay to which the set of objects or transport container is assigned, (iii) human personnel assigned to the loading/unloading the set of objects (e.g., characteristics of the human personnel assigned to a particular loading/unloading bay of the shipping facility), (iv) a runtime for implementing the loading/unloading the set of objects, (v) a runtime for determining a feasible solution, (vi) a storage, layout, and routing hardware of the shipping facility, such as an indication of whether the shipping facility has an area that may be implemented as a buffer zone to stage items and facilitate re-sequencing of items during loading/unloading, (vii) available loading/unloading hardware, such as robotic arms, robotically operated forklifts or other modalities, and the characteristics thereof (e.g., the capabilities, limitations, etc., such as extent to which a robotic arm may be configured to avoid/limit awkward poses, etc.), and (viii) the set of objects to be loaded/unloaded (e.g., the set of objects to be transported from location A to location B). Various other types of bounding may be implemented in connection with determining a solution for partitioning the set of objects.

In connection with determining an arrangement of a set of objects (e.g., determining one or more partitions according to which the set of objects are to be loaded), various embodiments of the model implement one or more other modules to assess the feasibility of an arrangement. Examples of the one or more other modules includes: (a) a modeling module that determines a model (e.g., a geometric model) of the workspace or transport container, (b) a simulation module that simulates pick/place operations to simulate the loading/unloading of one or more objects to/from the transport container, (c) a physics engine that simulates the physics of a transport container/loading, such as simulating forces acting on or between objects. The one or more modules invoked by the model are used to evaluate one or more of a density of objects in a transport container, a number of objects expected to be loaded to the transport container, a stability of a loading in a transport container, a weight distribution of the loading in the transport container, an expected runtime for implementing the loading/unloading the transport container. The one or more modules may be implemented to evaluate the loadings along various other dimensions.

In some embodiments, the model calls a physics engine to simulate the loading/unloading of a set of objects to/from a transport container, and to simulate the load within the transport container. The simulation of the loading/unloading may include simulating forces acting on/between objects during loading/unloading, or otherwise in connection with the placement of objects. As another example, the model may call a physics engine to simulate the transport of a load within the transport container (e.g., to simulate forces that may act on the load during transport).

The physics engine may model the transport container and/or a loading of objects to determine one or more properties associated with the loading of the objects to the transport container, such as a stability of set of objects, a weight distribution of the set of objects, etc. In some embodiments, the physics engine may determine a value pertaining to a stability (or expected stability) of the transport container and/or a loading of objects. The physics engine may determine that the transport container and/or a loading of objects is, or is expected to be, stable or unstable based on a comparison of a value pertaining to a stability (or expected stability) to a predefined stability threshold.

In some embodiments, the predefined stability threshold is set based on a confidence interval associated with stability. For example, the predefined stability threshold may be set such that 95% of the time the transport container/loading is stable and not subject to objects falling from the loading in the transport container, etc. As another example, the predefined stability threshold may be set such that 99% of the time the transport container/loading is stable. The predefined stability threshold may be set by a user, such as an administrator or other human operator.

In some embodiments, the physics engine is used in connection with determining an expected stability of a transport container/loading, such as before an action is implemented. For example, before performing placing an object to the transport container (e.g., during loading), the system uses the physics engine to evaluate an expected stability of placing the object at a particular location of the transport container. As another example, before removing an object from a transport container (e.g., during unloading), the system uses the physics engine to evaluate an expected stability of removing the object from the transport container. In response to a determination that the expected stability of a transport container/loading will be stable after performance of the action, the action may be performed or otherwise deemed to be an action that is a possible/permissible action. For example, in response to determining, after all of the objects to be loaded to the transport container are loaded, that the expected stability of the loading exceeds the stability threshold, the system deems the loading to be a feasible loading. Conversely, in response to a determination that the expected stability of a transport container/loading of objects will be not stable (or not sufficiently stable, such as less than a predetermined stability threshold) after performance of the action (e.g., complete or partial loading/unloading), the action may be performed or otherwise deemed to be an action that is a not possible/impermissible action.

In some embodiments, the physics engine is used in connection with determining a stability of a transport container/loading, such as after an action is implemented. The physics engine may be invoked by the system in connection with inline evaluation of loadings, such as in connection with determining whether the plan for loading the set of objects is to be updated (e.g., to account for variations in the expected geometric model simulated offline and the real-world characteristics of the loading of the objects). For example, after placing an object to a transport container (e.g., during loading), the system uses the physics engine to evaluate a stability in response to placing the object at a particular location in the transport container. As another example, after removing an object from the transport container (e.g., during unloading), the system may use the physics engine to evaluate the stability of the transport container/loading remaining after removal of the object. In response to a determination that the stability of a transport container/loading is stable (e.g., exceeds a predetermined stability threshold), the system may deem the transport container/loading as stable and plan a subsequent action (e.g., place a next object, or remove a next object, etc.). Conversely, in response to a determination that the stability of a transport container/loading is not stable (or not sufficiently stable, such as less than a predetermined stability threshold), the system may deem the transport container/loading as unstable and the system may implement a remedial action (e.g., to improve the stability of the transport container/loading).

According to various embodiments, the system implements a remedial action in response to a determination that the stability of a transport container/loading is not stable (or not sufficiently stable, such as less than a predetermined stability threshold). Examples of the remedial action include (i) providing an alert/indication to a user, (ii) requesting human intervention, (iii) determining and implementing a plan to remove an object from, or adjust the placement of the object within, the transport container/loading that is causing the instability, (iv) determining and implementing a plan to add an object to the transport container/loading that is expected to improve the stability of the transport container/loading (e.g., improve the stability to exceed a predetermined stability threshold), (v) determining to insert a spacer that is expected to improve the stability of the loading. In some embodiments, one or more remedial actions are implemented. The system may select one or more remedial actions to implement based at least in part on a likelihood (e.g., a measure of likelihood) that the one or more remedial actions may improve the stability, and/or an extent (e.g., a measure of the extent) to which the one or more remedial actions is expected to improve the stability.

In some embodiments, the physics engine is comprised in a module loaded and/or executed by a computer system that controls the robot performing loading/unloading of a set of items. In some embodiments, the physics engine is comprised in a module loaded and/or executed by a remote system (e.g., a server). For example, the physics engine may be hosted as a service that is called by one or more robotic systems to evaluate stability or expected stability of a transport container/loading, etc.

The system determines, in connection with invocation of the physics engine, the stability or expected stability based at least in part on sensor data pertaining to the workspace such as the transport container, objects being delivered or already delivered to the workspace, attributes of objects to be loaded/unloading to/from the transport container. As an example, the sensor data is obtained by a vision system associated with the workspace in which the robotic arm performing loading/unloading operates. In some embodiments, the physics engine determines, or obtains, a model of the transport container/loading. The model is generated based at least in part on the sensor data. The model of the transport container/loading may be generated by a modelling module that is called by the physics engine, etc. In some embodiments, the model comprises one or more attributes associated with one or more objects in the transport container/loading. Examples of an attribute of an item include size (e.g., length, width, height, etc.), weight, center of gravity, type of packaging, a measure of rigidity, an indication of whether the item is rigid, an identifier (e.g., a barcode, label, etc.), a measure of deformability, an indication of whether the object is deemed fragile, an indication of whether the object is deemed heavy (e.g., heavier than a predefined weight threshold), an indication of whether the object is deformable. Other attributes may be included in, or associated with, the model. According to various embodiments, the physics engine determines a stability of the transport container/loading based at least in part on the model of the transport container/loading. As an example, the physics engine determines a stability of the transport container/loading based on a position (or relative position) of one or more items in the transport container, and at least one attribute of at least one item.

In some embodiments, the system finds a preliminary solution and then iteratively seeks to improve the solution with respect to one or more predefined objectives. For example, in the case of determining an arrangement of a set of objects (or a placement(s) of a subset of the objects), the system uses the placement module to determine a preliminary feasible arrangement, and then seeks to improve the arrangement to improve the runtime of loading/unloading, improve the stability of the expected loadings, improve the weight distribution of the loadings for the partitions, etc. In some embodiments, the system uses one or more heuristics to make an intelligent guess on a preliminary solution. The one or more heuristics may be empirically determined based on a training set of historical simulations of loading/unloading objects to/from a transport container. For example, the one or more heuristics are determined based on implementing a machine learning process to infer the heuristics that are associated with solutions for which a corresponding scoring value (e.g., determined according to a predefined scoring function) exceeds a minimum scoring threshold. Examples of heuristics may include loading heavy objects first (e.g., an expected weight exceeding a predefined weight threshold), loading large objects first (e.g., an expected volume or dimension of the object exceeding a predefined size threshold), arranging heavy or large objects to be near the bottom of the transport container (e.g., on the floor of the transport container or within the first set of rows of objects, etc.), buffering fragile or deformable objects (e.g., a fragility or deformability exceeding a corresponding predefined fragility threshold or deformability threshold), providing a bias towards selecting a placement that results in a "T" junction being formed over a placement in which no "T" junction is formed, determining to load an object to form at least one "T" junction with other objects (e.g., in the event that the solution space for arranging the object includes solutions within which a "T" junction is formed and solutions within which the object is vertically on another object) or otherwise loading such objects towards the end of loading the transport container or loading such objects towards a top row of objects in the transport container, or otherwise loading such objects towards the end of loading the transport container or loading such objects towards a top row of objects in the transport container, etc. Various other heuristics may be implemented.

An example of the system finding a preliminary solution to partitioning of objects between two transport containers is to determine a set of placements according to which the objects are placed along the outside walls and successively placing objects between the objects at the wall. For example, the system determines to place a first object in a manner that the left wall is engaged and to place a second object in a manner that the right wall is engaged. The system then determines to successively place objects between the first object and the second object while moving towards the centerline of the transport container. The preliminary solution may be formed based on placements of a subset of the objects along the walls and then the successive placements to fill the gaps between the objects is optimized. In some embodiments, the system iterative tries to improve the solution. An example of iteratively attempting to improve the solution is by varying the placements, such as by changing the sequence of items, or varying the locations of the objects between the first and second objects placed against the wall(s). The system performs a simulation and calls the model to evaluate the various iterations of the solutions in connection with identifying feasible solutions. As another example, in response to determining a preliminary solution or an iteration of a solution, the system analyzes the loading (e.g., a model of the loading of the set of objects in the transport container) and determines the object placements that are expected to have caused instability or that are expected to have negatively impacted density. In response to identifying the placements that are expected to have negatively impacted density, stability, weight distribution etc., the system determines an alternative placement of such object(s) to improve the density, stability, weight distribution, etc. The system simulates alternative placement and evaluates the loading to determine whether the arrangement corresponds to a feasible solution.

In some embodiments, the system determines whether to re-order the objects in which the objects are to be placed in the transport container by determine whether to stage one or more objects in a buffer zone to enable the system to first place objects delivered to the workspace after the one or more objects The system selects a re-ordering of the objects that has both (i) the highest score according to the predefined scoring function, and (ii) satisfies one or more feasible loading criteria. Examples of feasible loading criterion include: (a) maximum amount of time to load, unload, or collectively load and unload, (b) a minimum expected density of objects loaded to the transport container, (c) a minimum number of total objects loaded to the transport container, (d) a minimum stability of the subset of objects loaded to the transport container, (e) a weight distribution that satisfies one or more criteria such as weight being distributed at locations of transport container corresponding to the wheels of a truck that is expected to carry the transport container or otherwise at locations of transport container where the transport container is supported during transport, etc. Various other feasible loading criteria may be implemented. The one or more feasible loading criteria may be minimum requirements for a loading of a set of objects in order for the loading to be deemed feasible.

Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) is a combined feature vector or set of features vectors and based on the combined feature vector or set of feature vectors the classifier model determines (i) a weight distribution of a loading of objects, (ii) whether a loading of a set of objects is feasible (e.g., safe, efficient), (iii) a partitioning of a set of objects into N subsets of objects (e.g., N partitions), (iv) a sequencing/ordering of the objects to be loaded into a particular transport container, (v) an arrangement/orientation of objects to be loaded into a particular transport container, etc.

Although the foregoing example is discussed in the context of a system loading a set of objects into one or more transport containers, the robotic system can also be used in connection with unloading a set of objects from one or more transport containers.

Figure 2A:
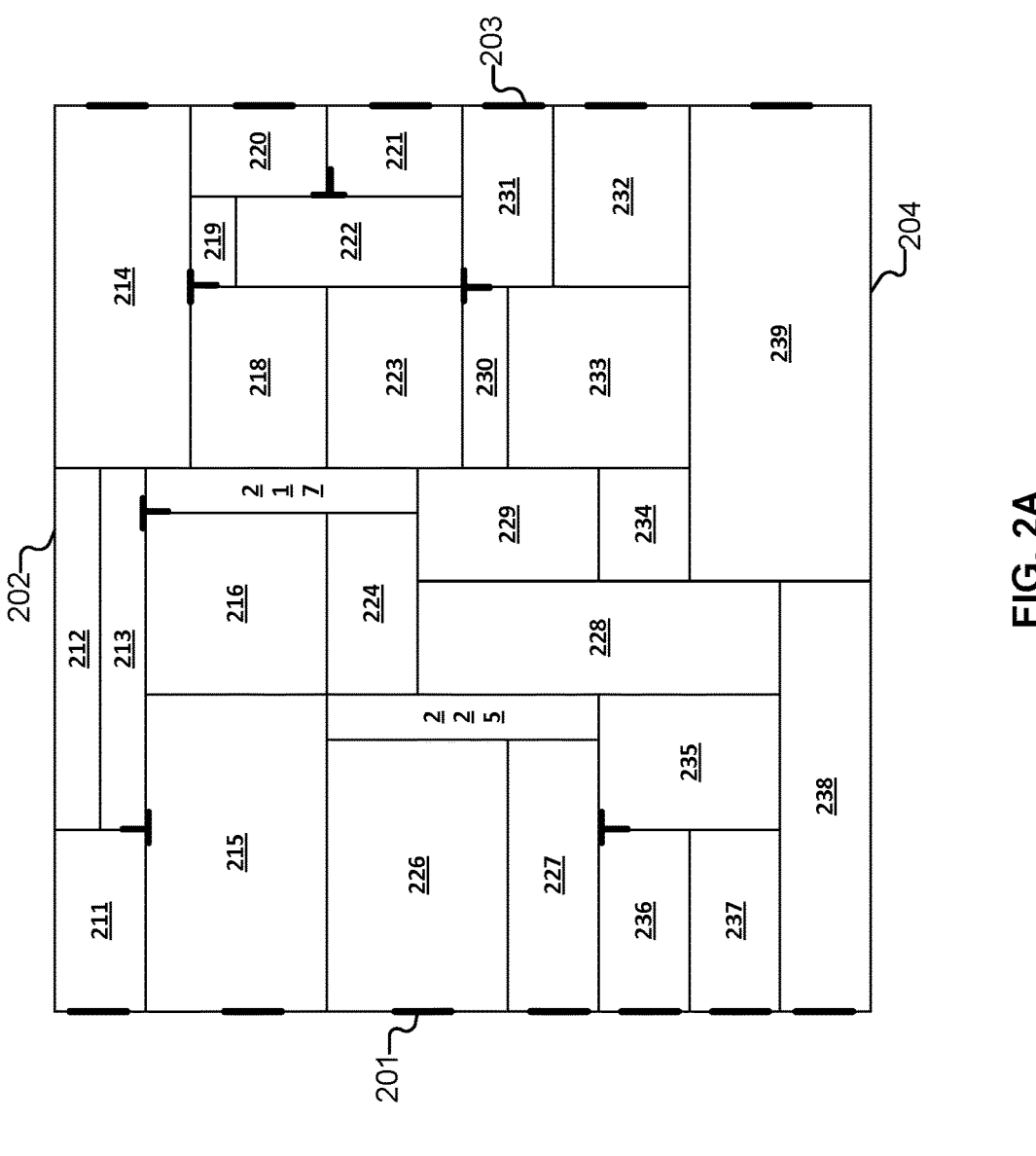
FIG. 2A is a diagram illustrating an arrangement of a set of objects in a transport container according to various embodiments.
Figure 2B:
FIG. 2B is a diagram illustrating an arrangement of a set of objects in a transport container according to various embodiments.

FIGS. 2A and 2B are diagrams illustrating arrangements of a set of objects in a transport container according to various embodiments. For example, FIGS. 2A and 2B show a view from the rear of the transport container.

In the example shown in FIG. 2A, the system obtains arrangement 200 for objects 211-239. The system determines arrangement 200 based on one or more boundary conditions such as location of side walls 201-204 of the transport container. In connection with determining arrangement 200, the system may generate/simulate a geometric model for placement of items such as to optimize the arrangement (or otherwise select a best arrangement within a predefined computation runtime) according to a predefined scoring threshold. In response to determining arrangement 200, the system scores arrangement 200 based on the predefined scoring threshold. For example, the obtained scoring value is indicative of the quality (e.g., goodness) of the arrangement. Arrangement 200 has a relatively high density of objects (e.g., the system has determined a loading without spaces between objects). Accordingly, arrangement 200 has a high scoring value at least along the density dimension or an object spacing (e.g., aggregate spacing between objects), however, arrangement 200 may be less high other dimensions, such as weight distribution, time to load the set of objects, the number of objects that are within the load, In the example shown in FIG. 2B, the system obtains arrangement 250 for objects 251-276. The system bounds the solution for the arrangement of objects 251-276 based on the location of side walls 201-204 of the transport container. In response to determining arrangement 250, the system scores arrangement 250 based on the predefined scoring threshold. Although arrangement 250 may have a high score along various dimensions such as weight distribution or runtime to load/unload, arrangement 250 has a relatively low density of objects (at least in the view from the rear of the transport container) and a relatively high amount of spacing among objects 251-276. For example, arrangement 250 has several gaps/spacing between certain objects, such as a gap above object 252, a gap between objects 262 and 264, a gap between objects 265 and 266, a gap between objects 253 and 257, etc.

In some embodiments, the system evaluates the loading on a depth layer of objects-by-depth layer of objects basis. For example, the system determines a loading for a layer of objects deepest into the transport container and then successively determines loadings for layers of objects placed as the robot works to load the objects into the transport container (e.g., from the deepest point in the transport container to the location corresponding to the opening at the rear of the transport container).

Figure 2C:
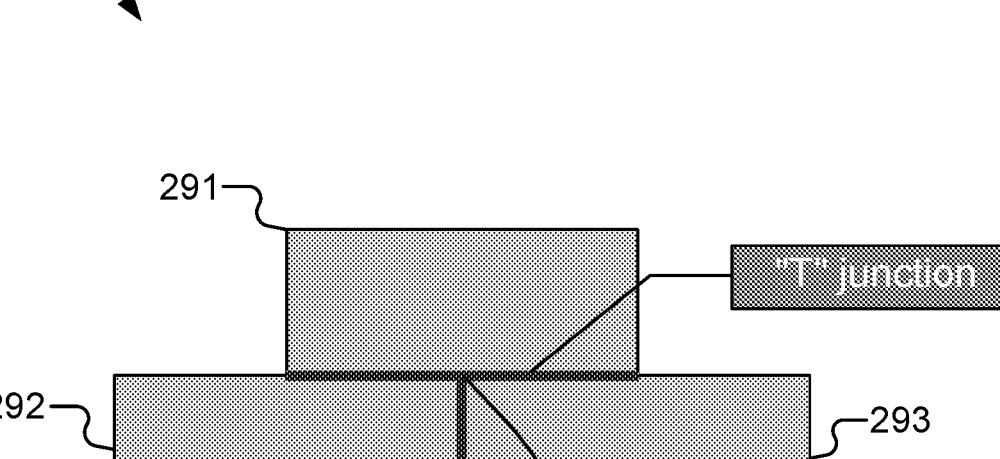
FIG. 2C is a diagram illustrating a "T" junction among a subset of objects in a transport container according to various embodiments.

FIG. 2C is a diagram illustrating a "T" junction among a subset of objects in a transport container according to various embodiments. In the example shown, a "T" junction is formed among arrangement 290. For example, objects 291-293 are placed in an arrangement in which "T" junction 294 is formed among objects 291-293. "T" junctions are generally deemed/expected to be more stable than vertical placements of objects (e.g., one object on top of another object, etc.).

In some embodiments, the system is biased towards selecting a placement of an object that results in a "T" junction with other objects from among a set of possible placements of the object. For example, the system uses a heuristic that a placement forms a "T" junction as a mechanism to trim the solution space of possible placements (e.g., solutions for which a "T" junction is not formed for a particular placement are trimmed from the solution space of possible placements).

FIGS. 3A, 3B, 3C, and 3D are diagrams illustrating arrangements of a set of objects in a transport container according to various embodiments. In the examples shown, arrangements 300 and 325 are illustrated from a side view within the transport container carried on trailer 301, which is supported by wheels 302, 303, and arrangements 350 and 375 are shown from a rear view of the transport container.

Figure 3A:
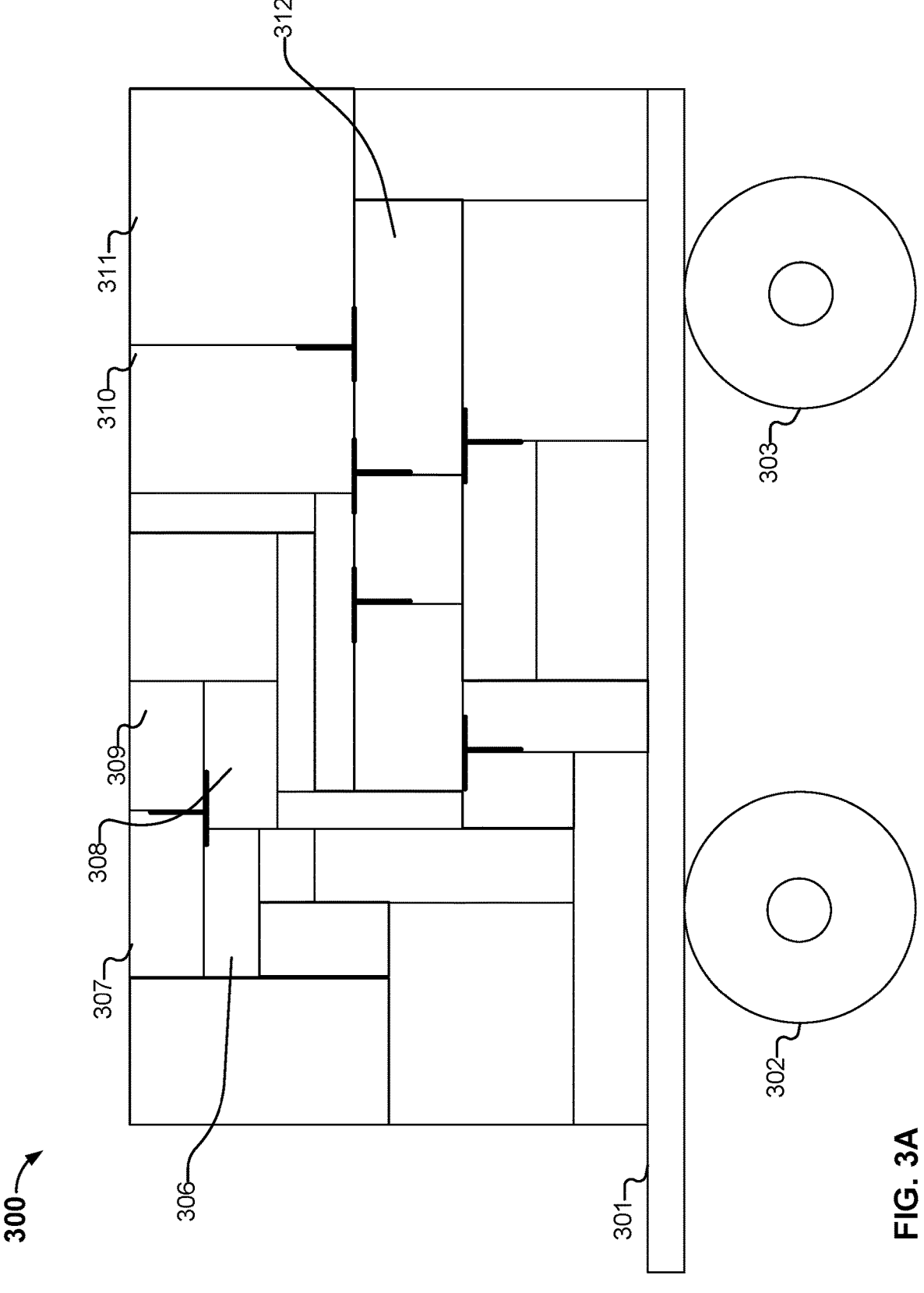
FIG. 3A is a diagram illustrating an arrangement of a set of objects in a transport container according to various embodiments.

As illustrated in FIG. 3A, arrangement 300 comprises objects that are loaded in a manner in which a density of objects is relatively high, an amount of spacing between objects is low (e.g., no spaces are provided in arrangement 300), and several "T" junctions are formed among objects loaded to the transport container. For example, arrangement 300 includes a first "T" junction among objects 306-308, a second "T" junction among objects 307-309, and a third "T" junction among objects 310-312. In some embodiments, the system is biased towards selecting placements of objects that are expected to result in a "T" junction being formed with other objects. For example, the system implements a heuristic associated with a preference for a "T" junction over a vertical stacking of objects.

Figure 3B:
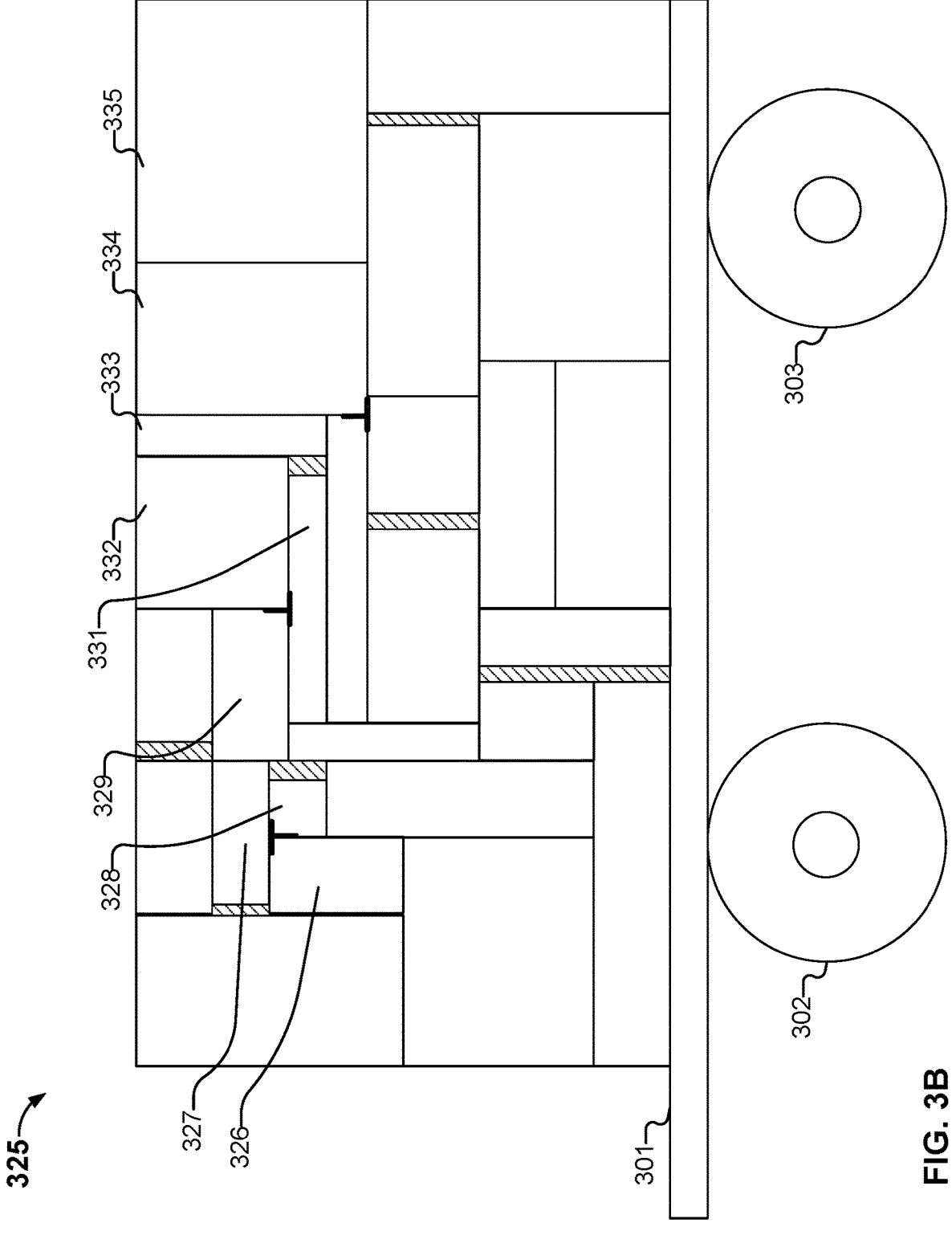
FIG. 3B is a diagram illustrating an arrangement of a set of objects in a transport container according to various embodiments.

As illustrated in FIG. 3B, arrangement 325 comprises objects that are loaded in a manner in which a density of objects is less than the density or arrangement 300, an amount of spacing between objects is higher than the spacing in arrangement 300 (e.g., spaces exist, for example, between objects 328 and 329, objects 331 and 333, etc.), and less "T" junctions are formed among objects loaded to the transport container. Spacing between objects is denoted by hashed areas. For example, the spacing between various objects impedes the presence of a greater number of "T" junctions. For example, arrangement 325 includes a first "T" junction among objects 305-307, a second "T" junction among objects 305-309, and a third "T" junction among objects 310-312. In some embodiments, the system is biased towards selecting placements of objects that are expected to result in a "T" junction being formed with other objects. For example, the system implements a heuristic associated with a preference for a "T" junction over a vertical stacking of objects.

Figure 3C:
FIG. 3C is a diagram illustrating an arrangement of a set of objects in a transport container according to various embodiments.

As illustrated in FIG. 3C, arrangement 350 comprises objects that are loaded in a manner in which a density of objects is relatively high, an amount of spacing between objects is low (e.g., no spaces are provided in arrangement 350), and several "T" junctions are formed among objects loaded to the transport container. For example, arrangement 350 includes a first "T" junction among objects 353-354, a second "T" junction among objects 354-356, a third "T" junction among objects 351, 357, and 359, a fourth "T" junction among objects 358-360, a fifth "T" junction among objects 351, 352, and 359, etc. In some embodiments, the system is biased towards selecting placements of objects that are expected to result in a "T" junction being formed with other objects. For example, the system implements a heuristic associated with a preference for a "T" junction over a vertical stacking of objects.

Figure 3D:
FIG. 3D is a diagram illustrating an arrangement of a set of objects in a transport container according to various embodiments.

As illustrated in FIG. 3D, arrangement 375 comprises objects that are loaded in a manner in which a density of objects is less than the density or arrangement 350, an amount of spacing between objects is higher than the spacing in arrangement 350 (e.g., spaces exist as denoted by the hashed areas, etc.), and less "T" junctions are formed among objects loaded to the transport container. For example, the spacing between various objects impedes the presence of a greater number of "T" junctions. For example, arrangement includes a first "T" junction among objects 384-386, a second "T" junction among objects 385-387, and a third "T" junction among objects 377-379, etc. In some embodiments, the system is biased towards selecting placements of objects that are expected to result in a "T" junction being formed with other objects. For example, the system implements a heuristic associated with a preference for a "T" junction over a vertical stacking of objects. As an example, object 377 is vertically stacked on an object, object 378 is vertically stacked on 376, etc. The presence of vertical stacking of objects may lead to instability. In some embodiments, the system attempts to find a solution in which an extent of the vertical stacking is minimized, or an extent of vertical stacking is less than a predefined number of vertical stacking placements, or a ratio of vertical stacking placements to objects loaded is less than a predefined vertical stacking threshold, etc.

In some embodiments, the system determines a manner to bound or trim the solution space of possible solutions (e.g., solutions for arranging a set of objects etc.). As an example, the system generates a tree structure/graph with each node corresponding to a decision with respect to an object (e.g., a placement of the object, etc.). The system may then determine a manner to trim the tree structure to eliminate non-feasible solutions or solutions that do not satisfy one or more predetermined criteria. As another example, the system bounds the solution space based at least in part on one or more constraints. An example of a constraint is a runtime within which the system is to determine a solution. In the case of an inline determination of a solution, the runtime may be 5 seconds or less. In the case of an offline determination of a solution, the runtime may be 12 hours or less, etc.

The system may use a heuristic to guess a solution (e.g., a partition, a sequence, an arrangement, etc.) and then evaluate the guess and trim/bound the search space accordingly.

Figure 4A:
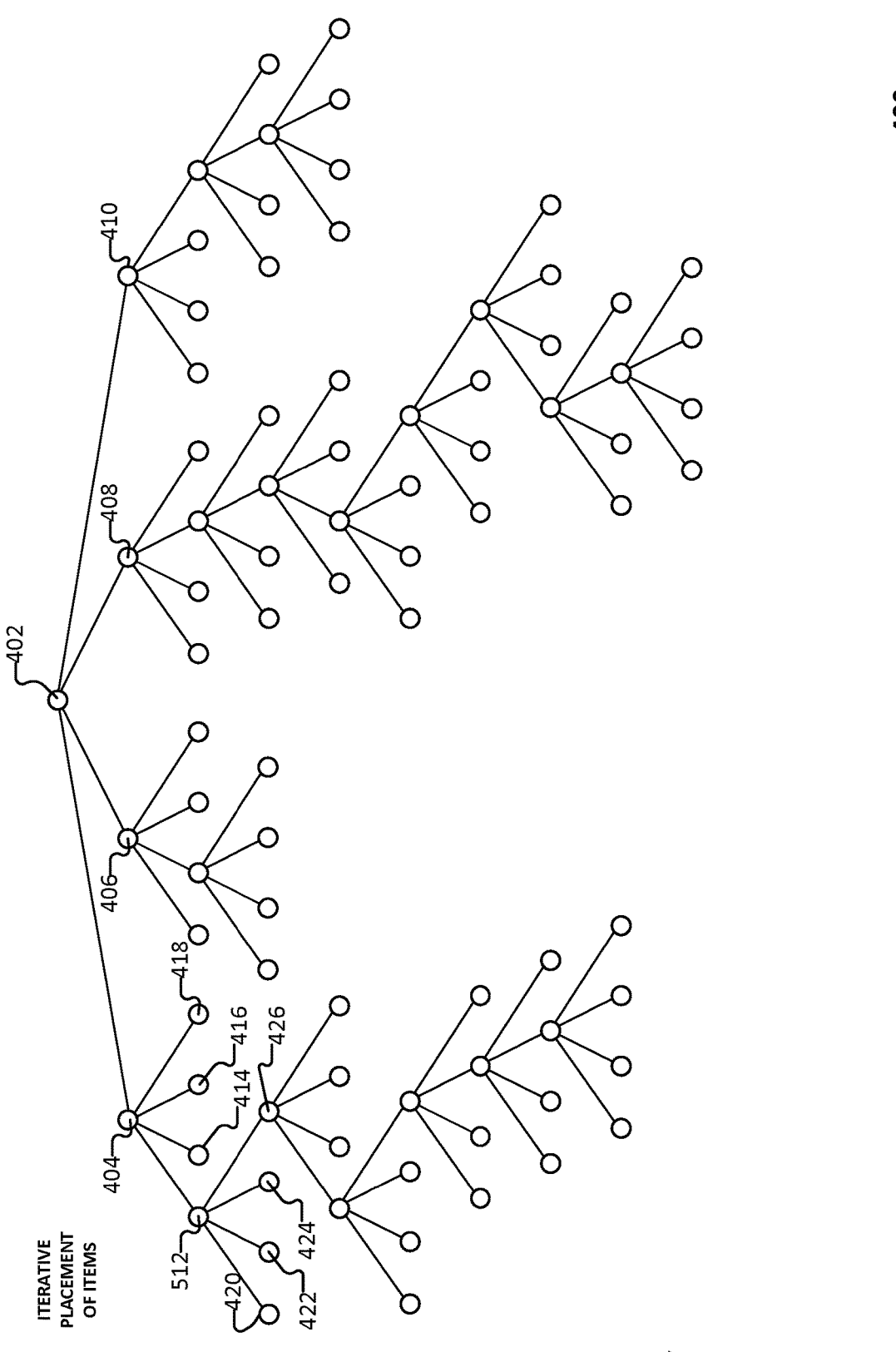
FIG. 4A is a tree corresponding to different states or placements of objects according to various embodiments.

FIG. 4A is a tree corresponding to different states or placements of objects according to various embodiments. In some embodiments, system 100 of FIG. 1 determines or uses search space 400 in connection with determining a placement(s) of one or more objects, such as a current (e.g., a next object from among a set of objects to be placed). In some embodiments, the system determines the placements offline, such as by a server that simulates arrangements of objects into one or more transport containers.

In the example illustrated in FIG. 4A, search space 400 is represented in a tree structure. Search space 400 comprises a plurality of nodes, and each node may correspond to a scenario of placement of an object and each branch may correspond to a place of a current object at a particular location and in a particular orientation. In some embodiments, the system determines whether a particular branch corresponds to a placement in which a "T" junction is created among the current object and other objects. For example, the system stores, for each branch in search space 400, whether the corresponding placement forms a "T" junction with other objects or a vertical stacking with another object Search space 400 comprises root node 402. Root node 402 corresponds to a current state of the pallet/stack of objects. For example, the system queries a state estimation service/module to obtain an estimated state and uses such estimated state as the state at root node 402.

Figure 4B:
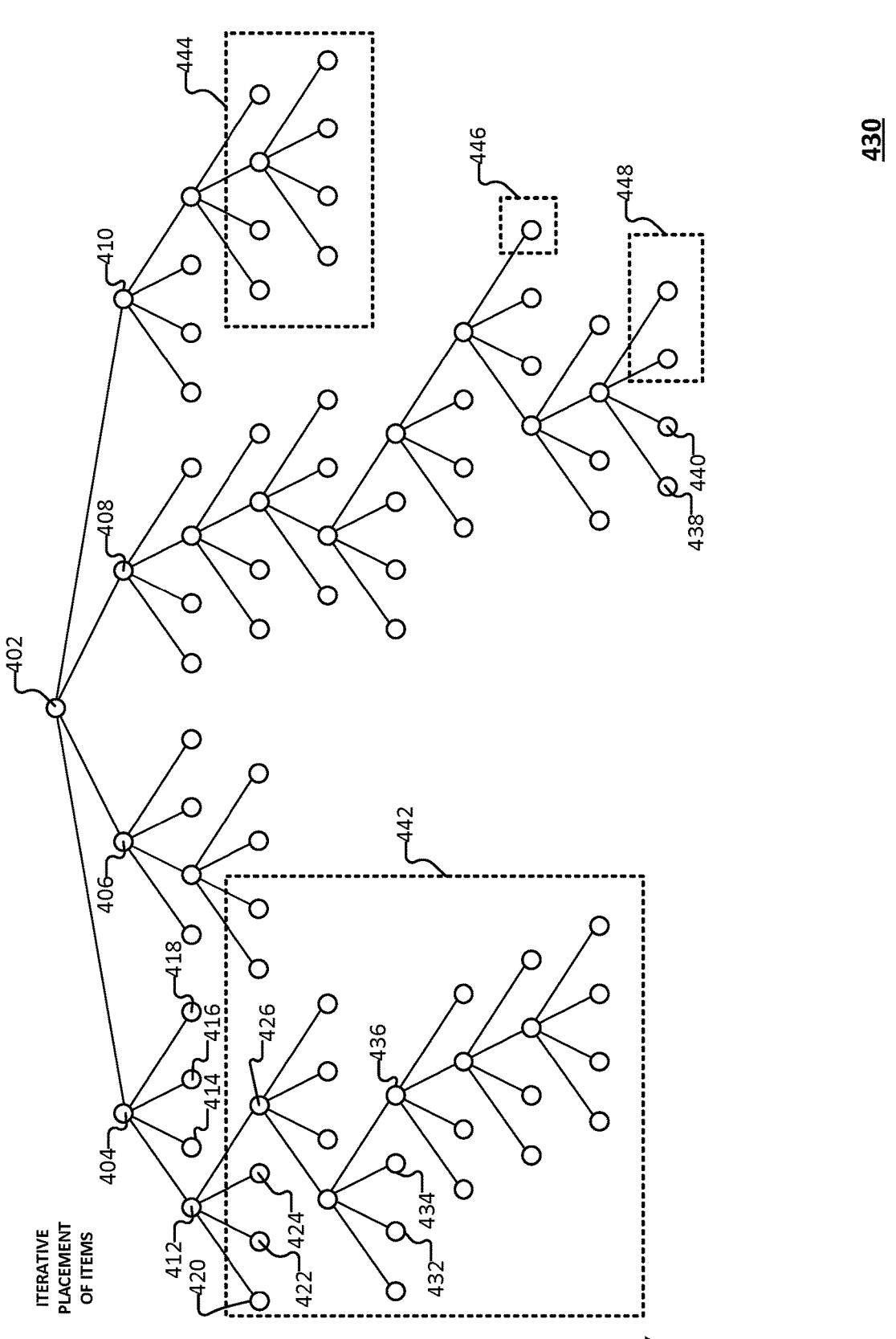
FIG. 4B is a tree corresponding to different states or placements of objects according to various embodiments.

In response to determining the root node, the system iteratively determines placements for a set of next objects. For example, the system progresses through the different orders of the tree based on placement of different next objects. Nodes 404, 406, 408, and 410 correspond to placement of a first next object (e.g., the object for which the system is determining a best placement). As an example, nodes 404, 406, 408, and 410 are first-order nodes respectively corresponding to different placements of a first next object (e.g., different locations and/or different orientations, or different objects in the case that the system is permitted to buffer some objects). As illustrated in FIGS. 4A and 4B, each of nodes 404, 406, 408, and 410 have second-order nodes respectively branching therefrom. For example, nodes 512, 514, 416, and 418 branch from node 404. Each of the second-order nodes respectively correspond to different placements of a second next object (e.g., different locations and/or different orientations, or different objects in the case that the system is permitted to buffer some objects). As the system determines placements corresponding to each node, the system determines nodes that branch from the nodes for placements of the remaining objects to be simulated. For example, in response to determining the placement for node 412, the system determines the nodes 420, 422, 424, and 426 (e.g., the system determines estimated states and associated information for the nodes).

If the system were to analyze the stability at each node in search space 400, such an analysis may be computationally expensive. Accordingly, as illustrated in FIG. 4B, various embodiments prune the search space to limit the number of nodes for which the state/stability is to be determined in connection with determining placement of an object (e.g., the first next object). In some embodiments, the system prunes the search space to limit the number of vertical stacking placements among the objects in a particular arrangement.

FIG. 4B is a tree corresponding to different states or placements of objects according to various embodiments. In some embodiments, system 100 of FIG. 1 determines or uses search space 430 in connection with determining a placement(s) of one or more objects, such as a current (e.g., a next object from among a set of objects to be placed). In some embodiments, the system determines the placements offline, such as by a server that simulates partitioning, sequencing, and/or arrangements of objects into one or more transport containers.

The system determines search space 430 based on determining whether to prune and/or a manner by which to prune search space 400. Segmented areas 442, 444, 446, and 448 correspond to areas of the tree that the system has determined to be unfavorable scenarios and thus pruned from search space 400 (e.g., the tree).

In some embodiments, the system determines whether a node corresponds to a favorable or unfavorable scenario based on one or more of (i) a simulation of the state of the stack of objects for the placements associated with the node, and (ii) one or more heuristics. In some embodiments, the system simulates the state of the stack of objects for the first-order nodes (e.g., 404, 406, 408, and 410) in connection with determining an estimated state and an expected stability of the stack of objects. In some embodiments, for all nodes (e.g., 412, 414, 416, 418, 420, 422, 424, 426, etc.) having an order higher than the first order nodes, the system uses one or more heuristics to determine whether the corresponding placement is expected to be an unfavorable scenario (e.g., expected to result in a stable or unstable stack, expected to have a significant cost such as a cost higher than a cost threshold, expected to cause the robot to be positioned in an awkward pose, expected to create a vertical stacking of objects, etc.).

According to various embodiments, in response to determining a state, an expected stability, and/or a result of an analysis of the favorability of the placement based on one or more heuristics, the system determines whether to prune the corresponding node(s). If the system determines to prune a node, the system prunes the node and all potential nodes that branch from the node. For example, in response to determining that node 426 is to be pruned (e.g., that the node corresponds to an unfavorable scenario), the system correspondingly determines to prune nodes 432, 434, 436, etc. based on such nodes branching directly or indirectly from node 426. In some embodiments, the system determines to prune nodes 432, 434, 436, etc. without further analysis using one or more heuristics. For example, the system determines to prune nodes 432, 434, 436, etc. based on the determination to prune node 426. In some embodiments, the system prunes all nodes (and the nodes that branch from such nodes) for which a "T" junction selection criteria is not satisfied, such as a ratio of "T" junctions to total objects is below a predefined "T" junction ratio threshold, or all nodes for which a vertical stacking of the objects corresponding to the arrangement exceeds a predefined vertical stacking threshold (e.g., a maximum ratio of objects vertically stacked relative to number of objects to be loaded).

In some embodiments, after determining search space 430 (e.g., after pruning the search space 400), the system determines a best placement for the next object (e.g., the object for the first-order nodes). The system can determine the best placement based on one or more of an expected stability, a cost for the placement, the cost of placing the next object and M objects after placement of the next object, an expected stability of the stack of objects after placement of the next object and the M objects after placement of the next object, a favorability of the placements, etc.

In some embodiments, the system determines that the best placement of the next object corresponds to the placement at node 408. For example, the system determines that the placement at node 408 is best based on a determination that the state of the stack of objects remains favorable (e.g., cost effective, stable, etc.) through several orders of placements (e.g., the state remains favorable for a placement of the highest number of subsequent objects, etc.). In some embodiments, the system determines that nodes 438 and 440 remain favorable through placement of nine different objects (e.g., the next object and the M objects after the next object, where M is eight in this example). In some embodiments, the system performs a beam search with respect to search space 430 to determine a best placement.

In connection with determining whether to prune a node, the system can implement a pruning criterion. The pruning criteria can include one or more of (i) the state is expected to have a stability less than a stability threshold, (ii) the state violates a heuristic (e.g., a deformable object being placed at or near the bottom of a stack of objects, etc.), (iii) a cost for the corresponding placements is expected to exceed a cost threshold, (iv) a robot is expected to be positioned in an awkward pose, (v) an expected density of the stack of objects being less than a predefined density threshold, etc.

Figure 5A:
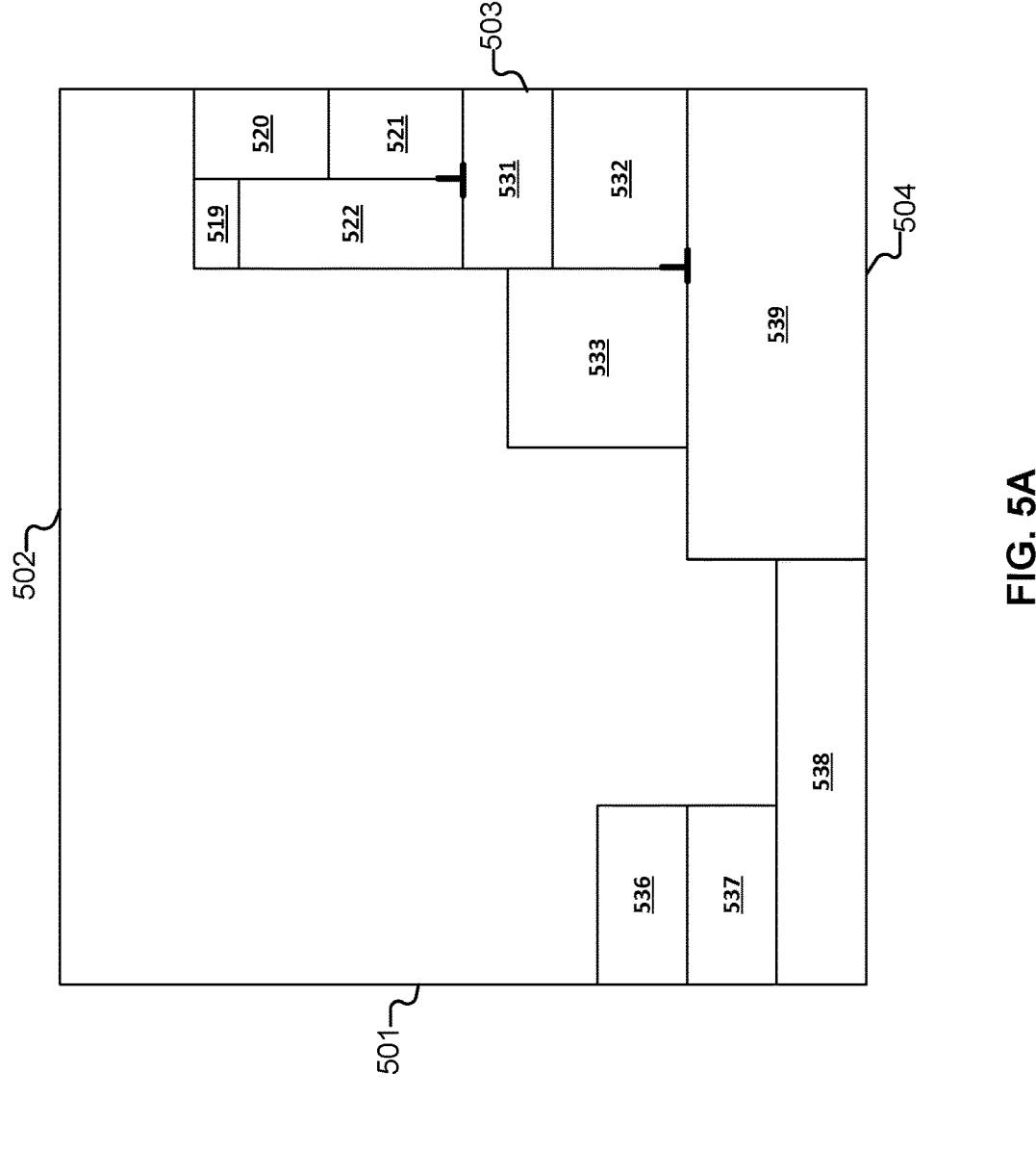
FIG. 5A is a diagram illustrating a subset of objects loaded to a transport container according to various embodiments.
Figure 5B:
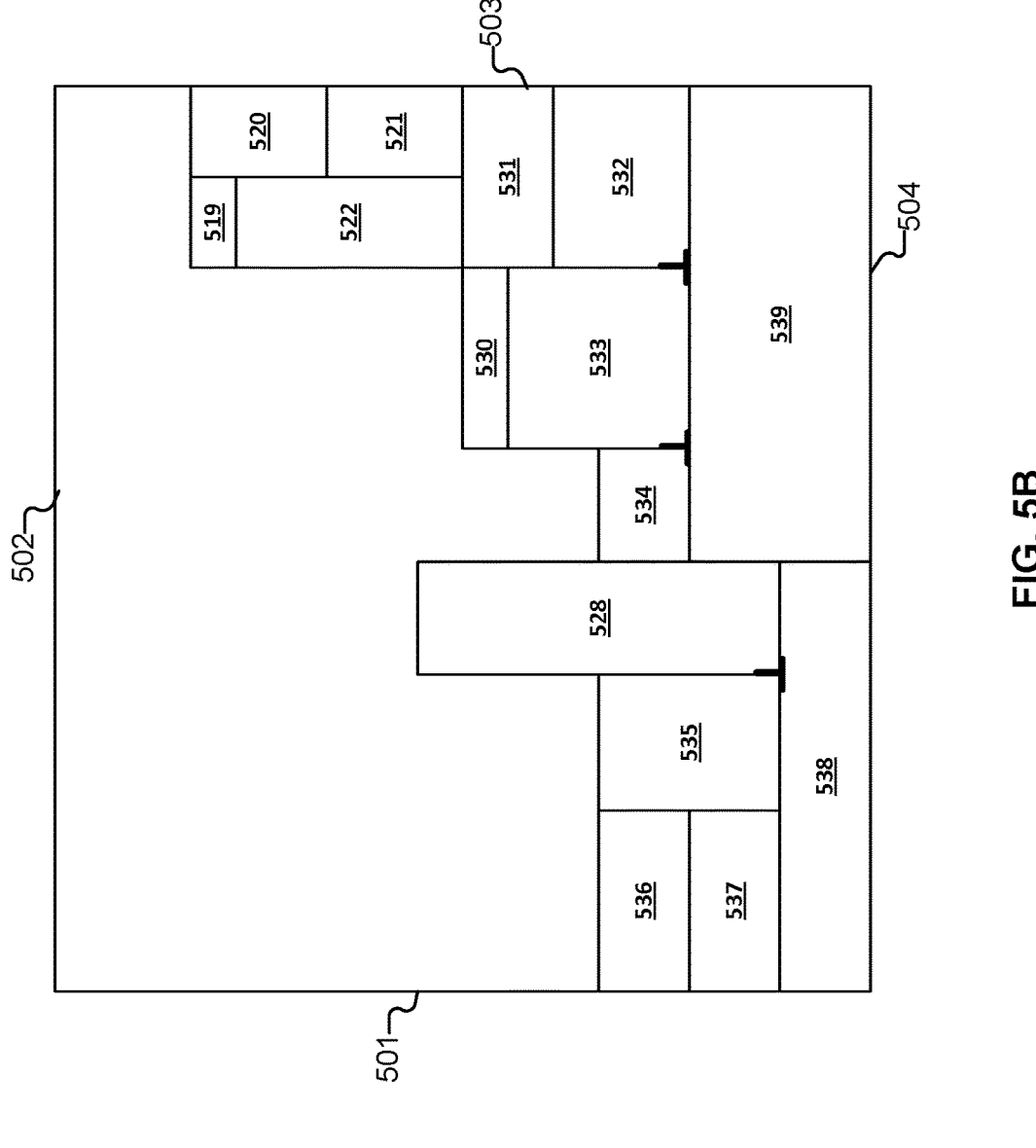
FIG. 5B is a diagram illustrating a subset of objects loaded to a transport container according to various embodiments.
Figure 5C:
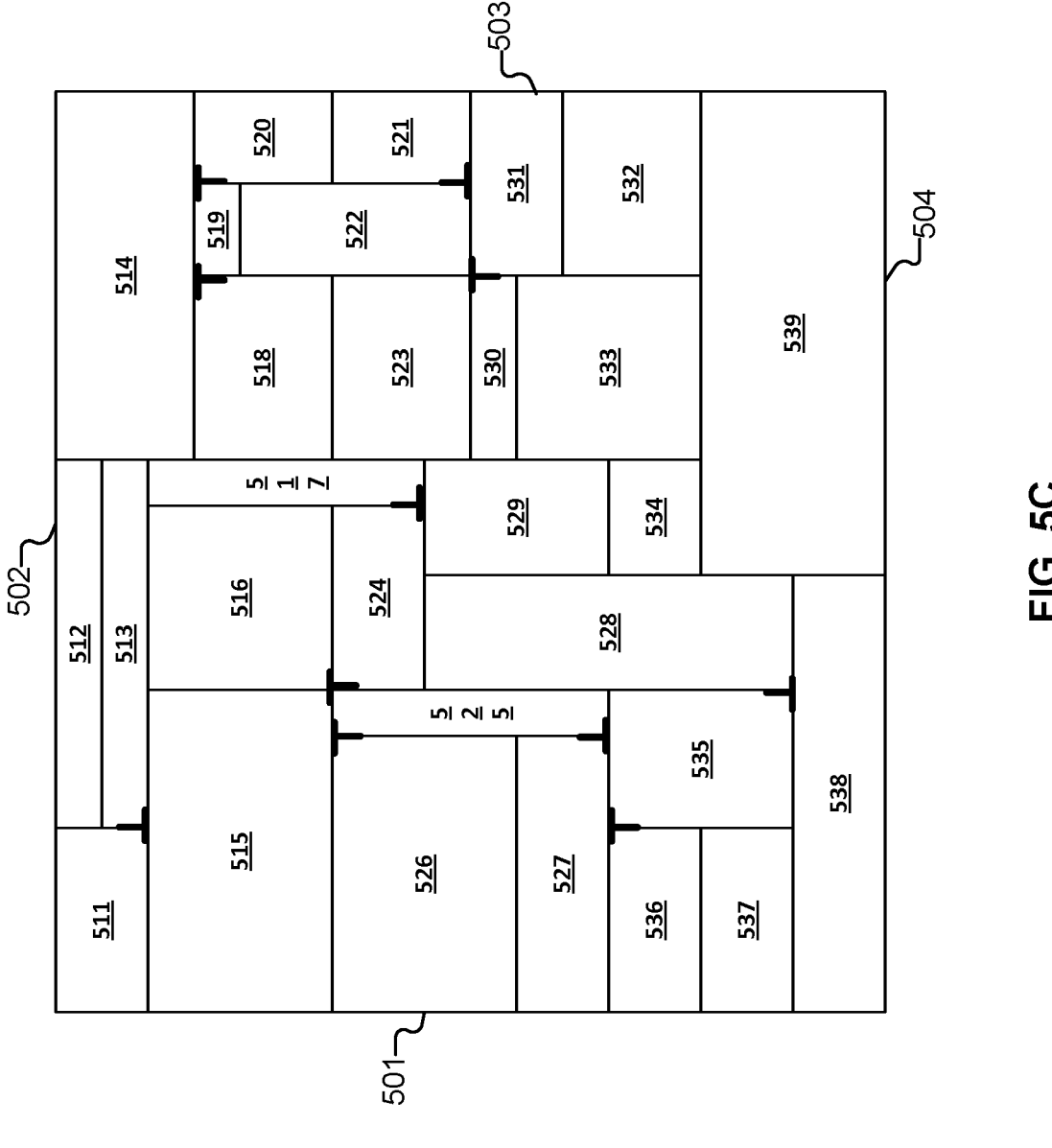
FIG. 5C is a diagram illustrating a set of objects loaded to a transport container according to various embodiments.

FIGS. 5A-5C are diagrams illustrating a subset of objects loaded to a transport container according to various embodiments. As illustrated in FIG. 5A-5C, an example of the framework for a sequence of loading objects 511-539 to a transport container is provided. The solution space for arrangements of objects 511-539 is bounded by walls 501-504 of the transport container. According to various embodiments, the system selects placements of objects 511-539 to optimize stability, such as based on an extent to which objects form "T" junctions.

In the example shown in FIG. 5A, arrangement 500 corresponds to a state towards the beginning of loading the objects to the transport container. The system works to load objects along side walls 501, 503 and successively placing objects towards the centerline until no further placements can occur within the layer or objects stretch from side wall 501 to side wall 503 without any space therebetween. As an example, a layer of objects may correspond to objects 538 and 539 forming a bottom layer of objects. In some implementations, a layer corresponds to a predefined height range. For example, objects 537, 538, and 539 may correspond to a single bottom layer.

Although FIG. 5A illustrates objects 519, 520-522, 531, and 532 being stacked along side wall 503 before objects in the lower layers are packed from side wall 501 to side wall 503, various embodiments may implement a bias in which a system preferentially arranges objects within a threshold number of layers (e.g., one layer, two layers, etc.) before proceeding with stacking objects along the walls to form a new layer. For example, after objects 537, 538, and 539 are placed, the system may select an object to place in the space between objects 537, 539 (e.g., above object 538). Thereafter, the system may place objects 532 and 536 before proceeding to placing objects within the layer between objects 532 and 536, such as placing object 533.

In the example shown in FIG. 5B, arrangement 550 corresponds to a state towards the middle of the process of loading the objects to the transport container. The system has sequentially packed objects between the objects loaded along side walls 501, 503. The system may successively load objects from the outside location corresponding to the side wall towards the centerline. For example, the system places object 535, then places object 528, then places object 534 to complete the layer and ensure the loading does not have any gaps between objects 532 and 536. After completing the layer between objects 532 and 536, the system may load object 530 to begin filling the layer between object 531 and side wall 501. In some embodiments, before placing object 530, the system may first place an object along side wall 501 above objects 536 and/or 535.

In the example shown in FIG. 5C, arrangement 575 corresponds to a state in which the loading the objects to the transport container is complete. The system has sequentially packed objects between the objects loaded along side walls 501, 503 and sequentially loading another layer of objects between side walls 501, 503 working from the outside towards the centerline of the layer. The system loads objects to limit the amount of spacing between objects in a particular layer. For example, the system selects object 529 as being ideally placed between object 538 and objects 30, 533 because object 529 fits within the gap to complete the layer. The system may further select object 529 because placement of object 529 creates a level top surface with object 528 on which one or more other objects may be more stably supported.

Although FIG. 5A-5C are described in connection with loading of the transport container, various embodiments implement a substantially similar process in reverse in connection with unloading objects 511-539.

Figure 6:
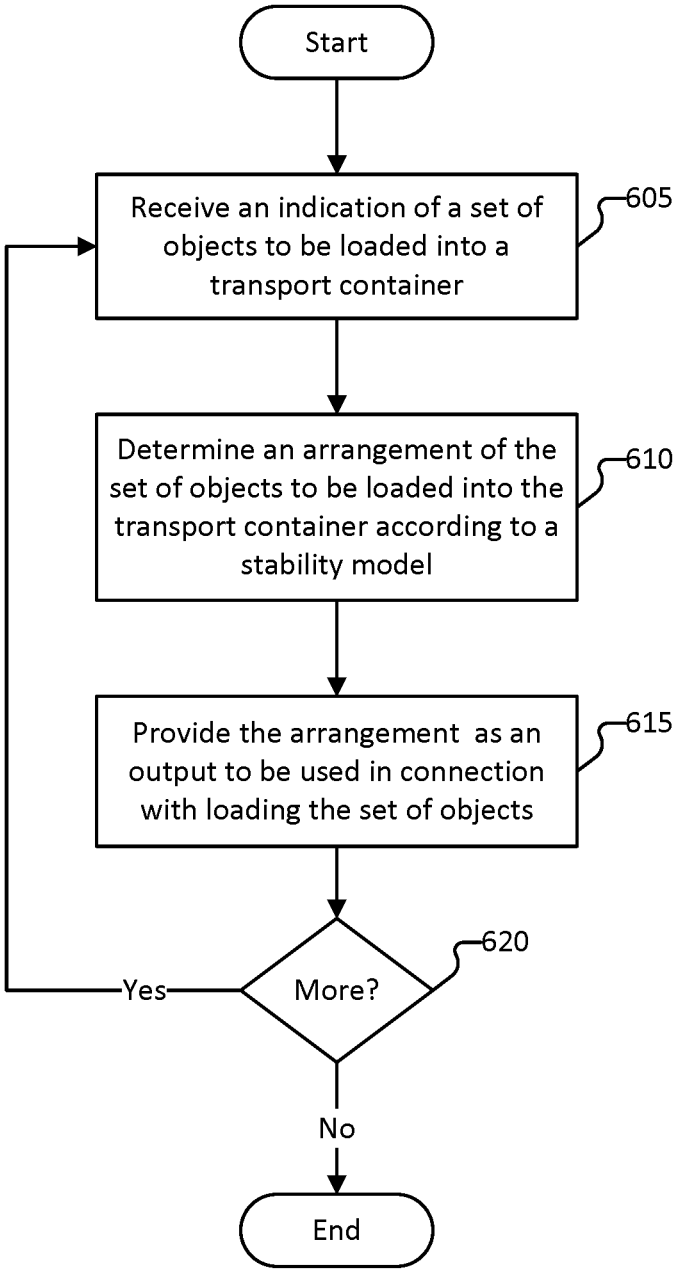
FIG. 6 is a flow chart illustrating a process for arranging a set of objects to be loaded into a set of transport containers according to various embodiments.

FIG. 6 is a flow chart illustrating a process for arranging a set of objects to be loaded into a set of transport containers according to various embodiments. In some embodiments, process 600 is implemented by system 100 of FIG. 1, or one or more servers such as in connection with providing a cloud service. In some embodiments, process 600 is implemented by the placement module. For example, the system (e.g., the model for planning the loading of objects) calls the placement module to invoke process 600.

At 605, an indication of a set of objects to be loaded into a transport container is received. In some embodiments, the indication of the set of objects may be determined based at least in part on information obtained from one or more sensors in a workspace, such as a vision system that detects objects delivered, or being delivered, to a robotic arm configured to load the objects to the transport container. In some embodiments, the system obtains the indication of the set of objects from a data structure, such as a set of objects mapped to a manifest or order, or other list of items to be loaded to a transport container or shipped to a particular destination location.

At 610, an arrangement of the set of objects to be loaded into the transport container according to a stability model. In response to receiving the indication that the set of objects are to be loaded into the transport container determines an arrangement according to which the objects are to be placed. For example, the arrangement may include a location of the various objects and/or an order in which the objects are loaded to the transport container. In some embodiments, the arrangement includes an indication of a plan according to which a robot is to load the objects into the transport container.

In some embodiments, the system determines the arrangement based at least in part on determining a particular arrangement that satisfies one or more stability criteria, or has a scoring value (e.g., determined according to a predefined scoring threshold) that exceeds a predefined scoring threshold. The one or more stability criteria may include a bias or threshold with respect to a minimum number or ratio of "T" junctions that is to be satisfied for feasible arrangements.

At 615, the arrangement is provided as an output to be used in connection with loading the set of objects. In some embodiments, the system provides the arrangement to a robotic system that is controlled to load the set of objects.

At 620, a determination is made as to whether process 600 is complete. In some embodiments, process 600 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 600 is to be paused or stopped, etc. In response to a determination that process 600 is complete, process 600 ends. In response to a determination that process 600 is not complete, process 600 returns to 605.

Figure 7:
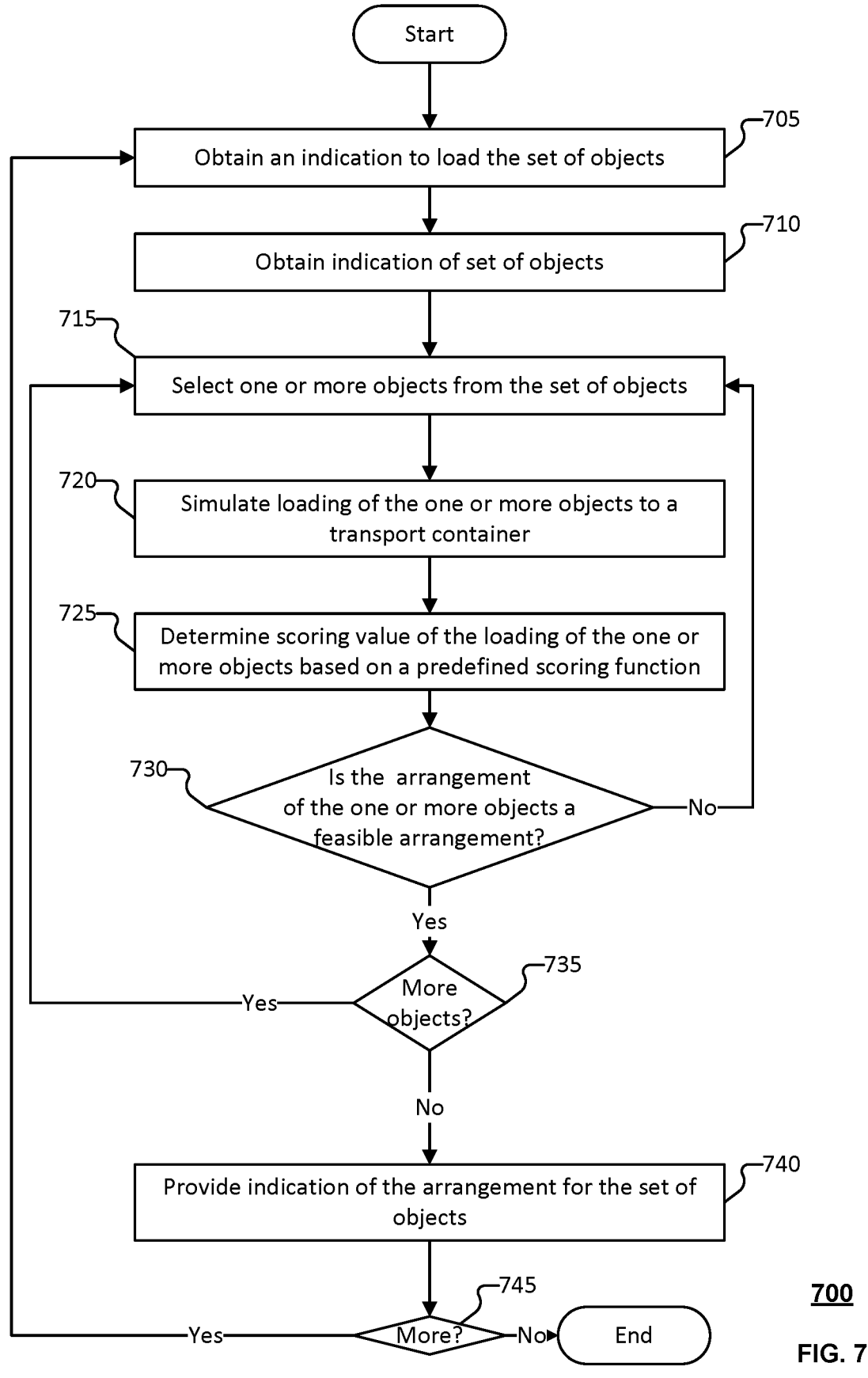
FIG. 7 is a flow chart illustrating a process for arranging a set of objects to be loaded into a set of transport containers according to various embodiments.

FIG. 7 is a flow chart illustrating a process for arranging a set of objects to be loaded into a set of transport containers according to various embodiments. In some embodiments, process 700 is implemented by system 100 of FIG. 1, or one or more servers such as in connection with providing a cloud service. In some embodiments, process 700 is implemented by the placement module. For example, the system (e.g., the model for planning the loading of objects) calls the placement module to invoke process 700. Process 700 may be invoked by process 600 of FIG. 6, such as at 610 of process 600.

At 705, an indication that a set of objects is to be loaded is received. In some embodiments, the system receives an indication that a set of objects are to be delivered to a destination location(s) and that a feasible solution for arranging a set of objects is to be provided.

At 710, an indication of the set of objects is received. In some embodiments, in connection with obtaining the indication to partition the set of objects, the system obtains the set of objects that are to be loaded and shipped to a destination location(s). As an example, the system obtains a manifest of objects. The obtaining the indication of the set of objects may include obtaining one or more attributes respectively associated with the objects. As another example, the system obtains the set of objects based on detecting a set of objects in (or being delivered to) a workspace of a robotic system to be controlled to load the objects to the transport container.

At 715, one or more objects are selected from the set of objects. In some embodiments, the system selects the one or more of objects based on one or more heuristics for arranging loadings. As an example, the one or more heuristics are obtained using machine learning processes. The machine learning process determines a set of heuristics that are expected to be indicative of feasible arrangements (e.g., arrangements for which the placements of objects are feasible or arrangements that otherwise satisfy one or more stability criteria or scoring threshold). An example of a heuristic may be to select heavier or larger objects (e.g., objects having a weight greater than a weight threshold or a dimension or volume larger than a size threshold) to arrange towards a bottom layer of the transport container (e.g., to avoid having heavy objects towards the end of the loading, which may be placed towards the top of the stacks/layers of the loadings thereby causing instability). As another example, a heuristic may be to select a rigid or non-fragile object (e.g., an object having a rigid packaging, a deformability less than a deformability threshold, etc.) to arrange towards a bottom layer of the transport container. As another example of a heuristic, the system may select objects based on a heuristic that for a particular layer, objects are to be placed (if feasible placements are possible) along the side walls and thereafter the space between the objects at the side walls is successfully filled until the layer is complete.

In some embodiments, the one or more objects are selected based on an order in which the objects are delivered to the workspace. For example, in the event that the system does not have a capability to buffer an object, the system selects the objects based on the order in which the objects arrive to the workspace. As another example, in the event that the system has the capability to buffer one or more objects, the system selects the one or more objects for which a best placement/arrangement is possible. The one or more objects are selected from among the next N objects taking into account the possibility of buffering M objects to re-order objects. N and M are positive integers.

In some embodiments, the system determines the arrangement based at least in part on an arrangement/placement model.

In some embodiments, the system determines the arrangement based at least in part on one or more heuristics. For example, the system uses one or more heuristics to make an educated guess of an arrangement that would be deemed feasible. The system can thereafter iteratively improve the arrangement based on evaluation of the arrangement. An initial arrangement (e.g., initial iteration of process 1500 for a set of objects) may be selected using the one or more heuristics, and subsequent arrangements may be variations of the initial arrangement, or a preceding arrangement based on updates to the arrangement based at least in part on the evaluation of the arrangement. The evaluation of the arrangement may identify one or more objects that are expected to cause the arrangement to be infeasible or to otherwise negatively impact a scoring of the arrangement in an extent greater than a predefined scoring threshold. For example, the evaluation of the arrangement identifies one or more objects expected to cause an instability. As another example, the evaluation of the arrangement identifies one or more objects expected to cause a violation of a weight distribution criterion or a stability criterion.

At 720, a loading of the one or more objects to a transport container is simulated. In some embodiments, the system calls a simulation module to simulate various loadings (e.g., arrangements, sequences, etc.) of the one or more objects. For example, the simulation module generates a geometric model of placements of the set of objects. As another example, the system simulates the loadings of the set of objects in order to determine whether a feasible arrangement/placement exists for the one or more objects or to select a best arrangement/placement of the one or more objects.

At 725, a scoring value of the loading of the one or more objects is determined based at least in part on a predetermined scoring function. In some embodiments, the system scores the arrangement based on the predetermined scoring function. For example, the system scores the arrangement in connection with evaluating whether the arrangement is a feasible/possible arrangement and/or determining a best arrangement.

In some embodiments, the predefined scoring function takes into account cost, time, stability, density, weight distribution, etc. Various other characteristics of a loading (e.g., arrangement) can be implemented in the predefined scoring function.

In some embodiments, the determining the scoring value of the loading includes comparing the loading with respect to one or more heuristics. For example, the system uses a set of heuristics to quickly determine whether the loading is expected to be feasible or infeasible. The system may use the set of heuristics to evaluate the loading before performing a computationally expensive simulation of the loading, such as to avoid arrangements for which the one or more heuristics indicate that the loading is expected to violate one or more loading criterion.

At 730, the system determines whether the arrangement of the one or more objects is a feasible arrangement. In some embodiments, the system determines whether the arrangement is a feasible arrangement based at least in part on a determination of whether the scoring value for the loading (e.g., the possible arrangement) exceeds a predefined scoring threshold.

In response to determining that the arrangement of the one or more objects is not a feasible arrangement at 730, process 700 returns to 715 at which another subset of the set of objects is selected and a loading of the next subset of the set of objects is simulated and evaluated. For example, process 700 iterates over 715-730 until an arrangement of one or more objects (e.g., a subset of the set of objects) is determined to be a feasible arrangement. Conversely, in response to determining that the arrangement of the one or more objects is a feasible arrangement at 730, process 700 proceeds to 735.

At 735, the system determines the set of objects comprises another object(s) for which a feasible arrangement is to be determined. In response to determining that the set of objects comprises another object(s) for which a feasible arrangement is to be determined at 735, process 700 returns to 715 and a next subset of the set of objects is simulated and evaluated. For example, process 700 iterates over 715-735 until no further arrangements for objects in the set of objects is to be determined. Conversely, in response to determining that the set of objects comprises no further objects for which a feasible arrangement is to be determined at 735, process 700 proceeds to 740 at which an indication of the arrangement of the set of objects is provided.

At 745, a determination is made as to whether process 700 is complete. In some embodiments, process 700 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 700 is to be paused or stopped, etc. In response to a determination that process 700 is complete, process 700 ends. In response to a determination that process 700 is not complete, process 700 returns to 705.

Figure 8:
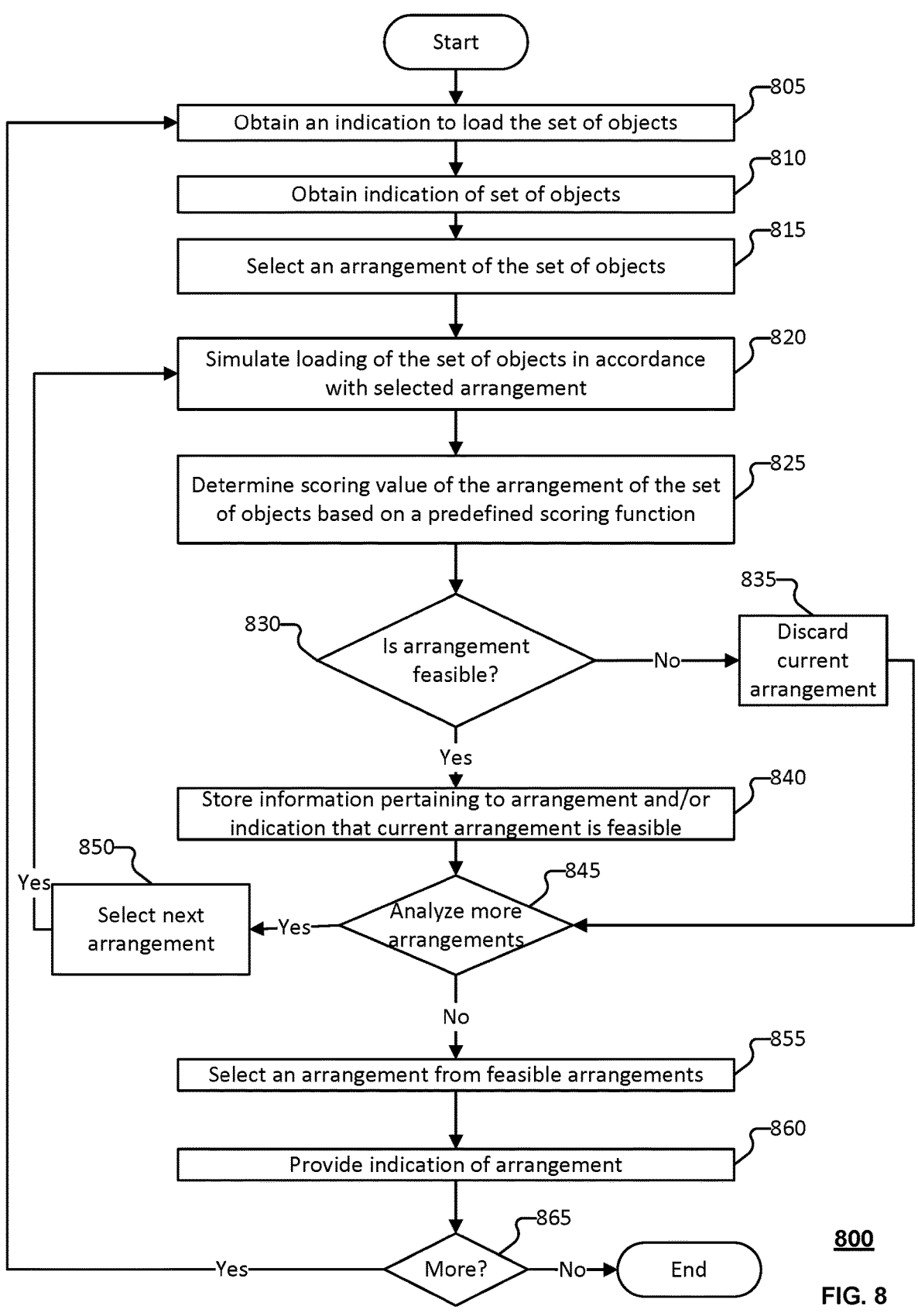
FIG. 8 is a flow chart illustrating a process for arranging a set of objects to be loaded into a set of transport containers according to various embodiments.

FIG. 8 is a flow chart illustrating a process for arranging a set of objects to be loaded into a set of transport containers according to various embodiments. In some embodiments, process 800 is implemented by system 100 of FIG. 1, or one or more servers such as in connection with providing a cloud service. In some embodiments, process 800 is implemented by the placement module. For example, the system (e.g., the model for planning the loading of objects) calls the placement module to invoke process 800. Process 800 may be invoked by process 600 of FIG. 6, such as at 610 of process 600.

In some embodiments, the system uses heuristics to determine order of selection. For example, the system selects objects to place along the sides before the middle, and the system may select the objects based on one or more heuristics, such as rigidity of the objects, a weight of the objects, a shape of the objects, etc.

At 805, an indication that a set of objects is to be loaded is received. At 810, an indication of the objects is obtained. At 815, an arrangement of the set of objects is selected. At 820, a loading of the one or more objects to a transport container in accordance with the selected arrangement is simulated. At 825, a scoring value of the arrangement of the one or more objects is determined based at least in part on a predetermined scoring function. At 830, the system determines whether the arrangement of the one or more objects is a feasible arrangement. In response to determining that the arrangement of the one or more objects is not a feasible arrangement at 830, process 800 proceeds to 835. Conversely, in response to determining that the arrangement of the one or more objects is a feasible arrangement at 830, process 800 proceeds to 840. According to various embodiments, 805-830 corresponds to, or is similar to, 705-730 of FIG. 7.

At 835, the current arrangement is discarded. In some embodiments, in response to determining that a particular arrangement is not feasible, the arrangement is discarded from a set of potential arrangements.

At 840, information pertaining to the arrangement and/or an indication that the current arrangement is feasible is stored.

At 845, the system determines whether an additional arrangement(s) is to be analyzed. In some embodiments, process 800 iterates over 820-845 until no further arrangements for various sets of objects are to be determined, or until no further potential arrangements for arranging/loading a particular set of objects are to be evaluated. For example, process 800 may end after a first arrangement is deemed to be a feasible arrangement, after the evaluation of arrangements has been performed for a predefined time threshold, or a set of X possible/feasible arrangements is determined for arranging/loading a set of objects to be loaded to the transport container. X may be a positive integer. A best arrangement among the evaluated feasible arrangements may be selected as the arrangement to implement.

In response to determining that an additional arrangement(s) is to be analyzed at 845, process 800 proceeds to 850 at which a next arrangement is selected. Process 800 thereafter returns to 820 and process 800 iterates over 820-845 until no further arrangements are to be analyzed. Conversely, in response to determining that no additional arrangement(s) is to be analyzed at 845, process 800 proceeds to 855.

At 855, an arrangement is selected from feasible arrangements. In some embodiments, the system selects the optimal or best arrangement from among the set of feasible arrangements. As an example, the optimal or best arrangement is selected based at least in part on a scoring value of the arrangement. The scoring value is determined according to a predefined scoring threshold, and the arrangement having the highest scoring value is deemed the optimal or best arrangement.

In some embodiments, the determining an arrangement for a set of objects is bounded by a required runtime within which the system is to evaluate and select an arrangement. If the runtime expires before the system has evaluated all the arrangements (e.g., all the potentially feasible solutions), the system selects the best arrangement of the set of feasible arrangements determined as of the expiration of the runtime.

At 860, an indication of the arrangement is provided. In some embodiments, the system provides the indication of the arrangement is provided to another system or module that invoked process 800 (e.g., process 600), or a robotic system to be used to load the set of objects into the transport container. In some embodiments, the providing the indication of the arrangement comprises storing the arrangement in a set of feasible arrangements (e.g., from which a preferred or best arrangement may be selected for implementation).

At 865, a determination is made as to whether process 800 is complete. In some embodiments, process 800 is determined to be complete in response to a determination that no further objects are to be loaded into the transport container, in response to a determination that an arrangement is selected for the loading of the set of objects, the system receives confirmation that a robotic system configured to load objects to a transport container receives the arrangement, the system receives an indication that the robotic system has completed loading the set of objects to the transport container(s), an administrator indicates that process 800 is to be paused or stopped, etc. In response to a determination that process 800 is complete, process 800 ends. In response to a determination that process 800 is not complete, process 800 returns to 805.

Figure 9:
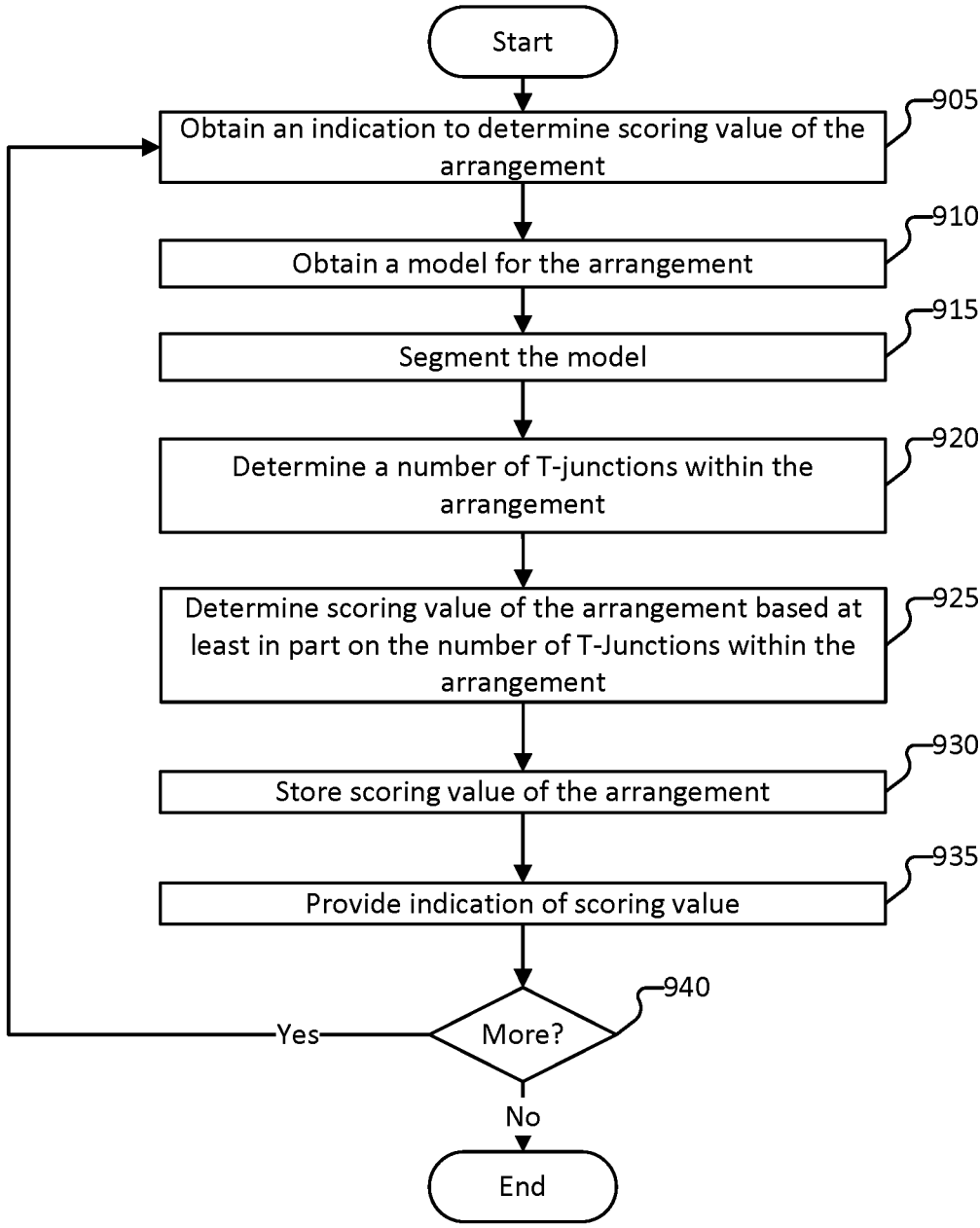
FIG. 9 is a flow chart illustrating a process for evaluating an arrangement of a set of objects to be loaded into a transport container according to various embodiments.

FIG. 9 is a flow chart illustrating a process for evaluating an arrangement of a set of objects to be loaded into a transport container according to various embodiments. In some embodiments, process 900 is implemented by system 100 of FIG. 1, or one or more servers such as in connection with providing a cloud service. In some embodiments, process 900 is implemented by the placement module. For example, the system (e.g., the model for planning the loading of objects) calls the placement module to invoke process 900. As an example, process 900 is invoked by 825 of process 800.

At 905, an indication to determine a scoring value of the arrangement is obtained. In some embodiments, the system receives the indication to determine the scoring value in connection with determining whether the arrangement is feasible. For example, the system simulates the loading according to the arrangement and evaluates the simulated loading.

At 910, a model for the arrangement is obtained. In some embodiments, the system obtains or generates a model of the arrangement according to the simulation. As an example, the model is a geometric representation of the set of objects placed in accordance with the corresponding arrangement.

At 915, the model is segmented. In response to obtaining the model, the system segments the model to identify the various objects loaded within the transport container. In some embodiments, the model is already segmented (e.g., the simulation of the arrangement maintains the segmentation of objects) and in such a case 915 may be omitted.

At 920, a number of "T"-junctions within the arrangement is determined. The system analyzes the model of the loading of set of objects and determines a number of "T" junctions formed among objects.

At 925, a scoring value of the arrangement is determined based at least in part on the number of "T"-junctions within the arrangement. In some embodiments, the system determines the scoring value of the arrangement according to a predefined scoring function, which is based at least in part on the number of "T"-junctions within the arrangement.

At 930, the scoring value of the arrangement is stored.

At 935, an indication of the scoring value for the arrangement is provided. The indication of the scoring value may be provided to another system or module that invoked process 900 (e.g., process 800), or a robotic system to be used to load the set of objects into the transport container. In some embodiments, the providing the indication of the scoring value comprises storing the scoring value associated with the arrangement (e.g., from which a preferred or best arrangement may be selected for implementation), such as in a mapping of arrangements to scoring values.

At 940, a determination is made as to whether process 900 is complete. In some embodiments, process 900 is determined to be complete in response to a determination that no further arrangements are to be evaluated, in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 900 is to be paused or stopped, etc. In response to a determination that process 900 is complete, process 900 ends. In response to a determination that process 900 is not complete, process 900 returns to 905.

Figure 10:
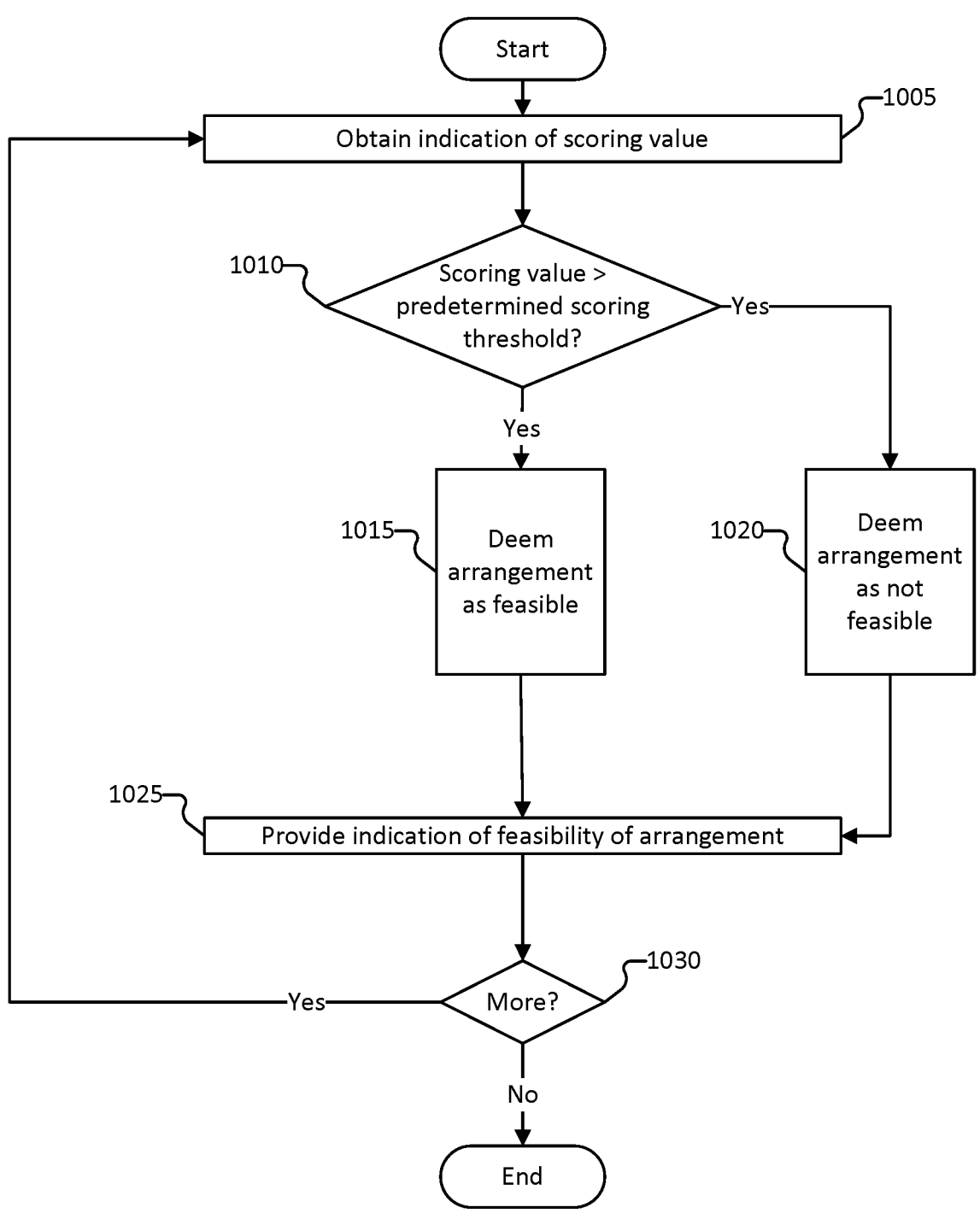
FIG. 10 is a flow chart illustrating a process for evaluating an arrangement of a set of objects to be loaded into a transport container according to various embodiments.

FIG. 10 is a flow chart illustrating a process for evaluating an arrangement of a set of objects to be loaded into a transport container according to various embodiments. In some embodiments, process 1000 is implemented by system 100 of FIG. 1, or one or more servers such as in connection with providing a cloud service. In some embodiments, process 1000 is implemented by the placement module. For example, the system (e.g., the model for planning the loading of objects) calls the placement module to invoke process 1000. As an example, process 1000 is invoked by 830 of process 800.

At 1005, an indication of the scoring value is obtained. At 1010, the system determines whether the scoring value is greater than the predetermined scoring threshold. In response to determining that the scoring value is greater than the predetermined scoring threshold at 1010, process 1000 proceeds to 1015 at which the arrangement is deemed feasible. Conversely, in response to determining that the scoring value is not greater than the predetermined scoring value at 1010, process 1000 proceeds to 1020 at which the arrangement is deemed as not feasible. At 1025, an indication of the feasibility of the arrangement is provided. The indication of the feasibility may be provided to another system or module that invoked process 1000 (e.g., process 800), or a robotic system to be used to load the set of objects into the transport container. In some embodiments, the providing the indication of the feasibility of the arrangement comprises storing the arrangement in a set of feasible arrangements (e.g., from which a preferred or best arrangement may be selected for implementation), such as a list of feasible arrangements.

At 1030, a determination is made as to whether process 1000 is complete. In some embodiments, process 1000 is determined to be complete in response to a determination that no further arrangements are to be evaluated, in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1000 is to be paused or stopped, etc. In response to a determination that process 1000 is complete, process 1000 ends. In response to a determination that process 1000 is not complete, process 1000 returns to 1005.

Figure 11:
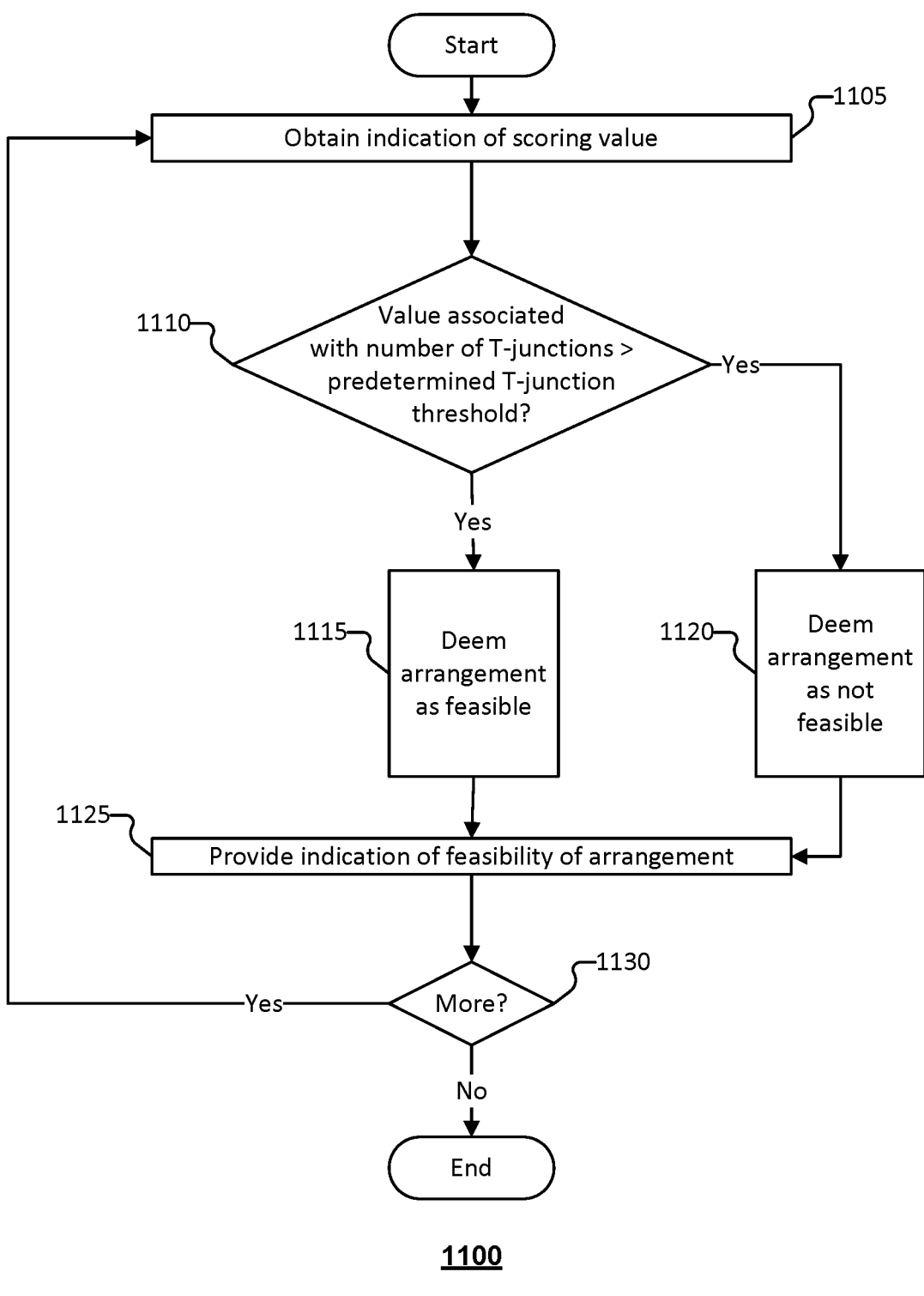
FIG. 11 is a flow chart illustrating a process for evaluating an arrangement of a set of objects to be loaded into a transport container according to various embodiments.

FIG. 11 is a flow chart illustrating a process for evaluating an arrangement of a set of objects to be loaded into a transport container according to various embodiments. In some embodiments, process 1100 is implemented by system 100 of FIG. 1, or one or more servers such as in connection with providing a cloud service. In some embodiments, process 1100 is implemented by the placement module. For example, the system (e.g., the model for planning the loading of objects) calls the placement module to invoke process 1100. As an example, process 1100 is invoked by 830 of process 800.

At 1105, an indication of the scoring value is obtained. At 1110, the system determines whether a value associated with a number of "T"-junctions in the arrangement is greater than the predetermined "T"-junction threshold.

In response to determining that value associated with a number of "T"-junctions in the arrangement is greater than the predetermined "T"-junction threshold at 1110, process 1100 proceeds to 1115 at which the arrangement is deemed feasible. Conversely, in response to determining that value associated with a number of "T"-junctions in the arrangement is not greater than the predetermined "T"-junction threshold at 1110, process 1100 proceeds to 1120 at which the arrangement is deemed as not feasible.

At 1125, an indication of the feasibility of the arrangement is provided. The indication of the feasibility may be provided to another system or module that invoked process 1000 (e.g., process 800), or a robotic system to be used to load the set of objects into the transport container. In some embodiments, the providing the indication of the feasibility of the arrangement comprises storing the arrangement in a set of feasible arrangements (e.g., from which a preferred or best arrangement may be selected for implementation), such as a list of feasible arrangements.

At 1130, a determination is made as to whether process 1100 is complete. In some embodiments, process 1100 is determined to be complete in response to a determination that no further arrangements are to be evaluated, in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1100 is to be paused or stopped, etc. In response to a determination that process 1100 is complete, process 1100 ends. In response to a determination that process 1100 is not complete, process 1100 returns to 1105.

Figure 12:
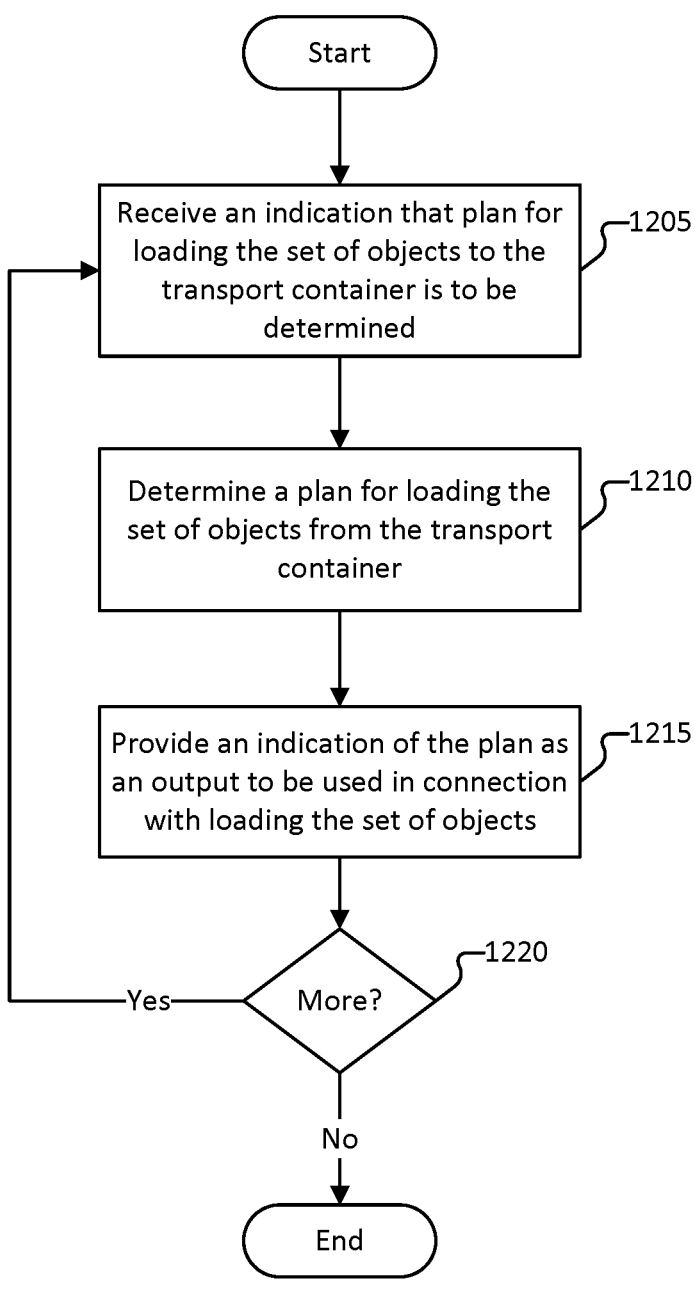
FIG. 12 is a flow chart illustrating a process for planning a loading of a set of objects to a transport container according to various embodiments.

FIG. 12 is a flow chart illustrating a process for planning a loading of a set of objects to a transport container according to various embodiments. In some embodiments, process 1200 is implemented by system 100 of FIG. 1, or one or more servers such as in connection with providing a cloud service. In some embodiments, process 1200 is implemented by the placement module. For example, the system (e.g., the model for planning the loading of objects) calls the placement module to invoke process 1200.

At 1205, an indication that a plan is to be determined for loading the set of objects to the transport container is received. In some embodiments, in response to determining/selecting an arrangement for loading a set of objects, the system determines a plan by which a robotic arm is to load the set of objects to the transport container in accordance with the arrangement.

At 1210, a plan for loading the set of objects to the transport container is determined. The system may determine the plan for loading the set of objects based on a building of the loading layer-by-layer (e.g., layering from a bottom of the transport container to the top of the transport container) and/or based on loading objects at a deepest available location/layer within the transport container and successively loading objects until the placements are towards the rear of the transport container or the set of objects has been fully loaded.

At 1215, an indication of the plan is provided as an output to be used in connection with loading the set of objects. In some embodiments, the system provides the plan to a robotic system that is controlled to load the set of objects.

At 1220, a determination is made as to whether process 1200 is complete. In some embodiments, process 1200 is determined to be complete in response to a determination that no further plans for loading objects into the transport container are to be determined, the system receives confirmation that a robotic system configured to load objects to a transport container receives the arrangement, the system receives an indication that the robotic system has completed loading the set of objects to the transport container(s), an administrator indicates that process 1200 is to be paused or stopped, etc. In response to a determination that process 1200 is complete, process 1200 ends. In response to a determination that process 1200 is not complete, process 1200 returns to 1205.

Figure 13:
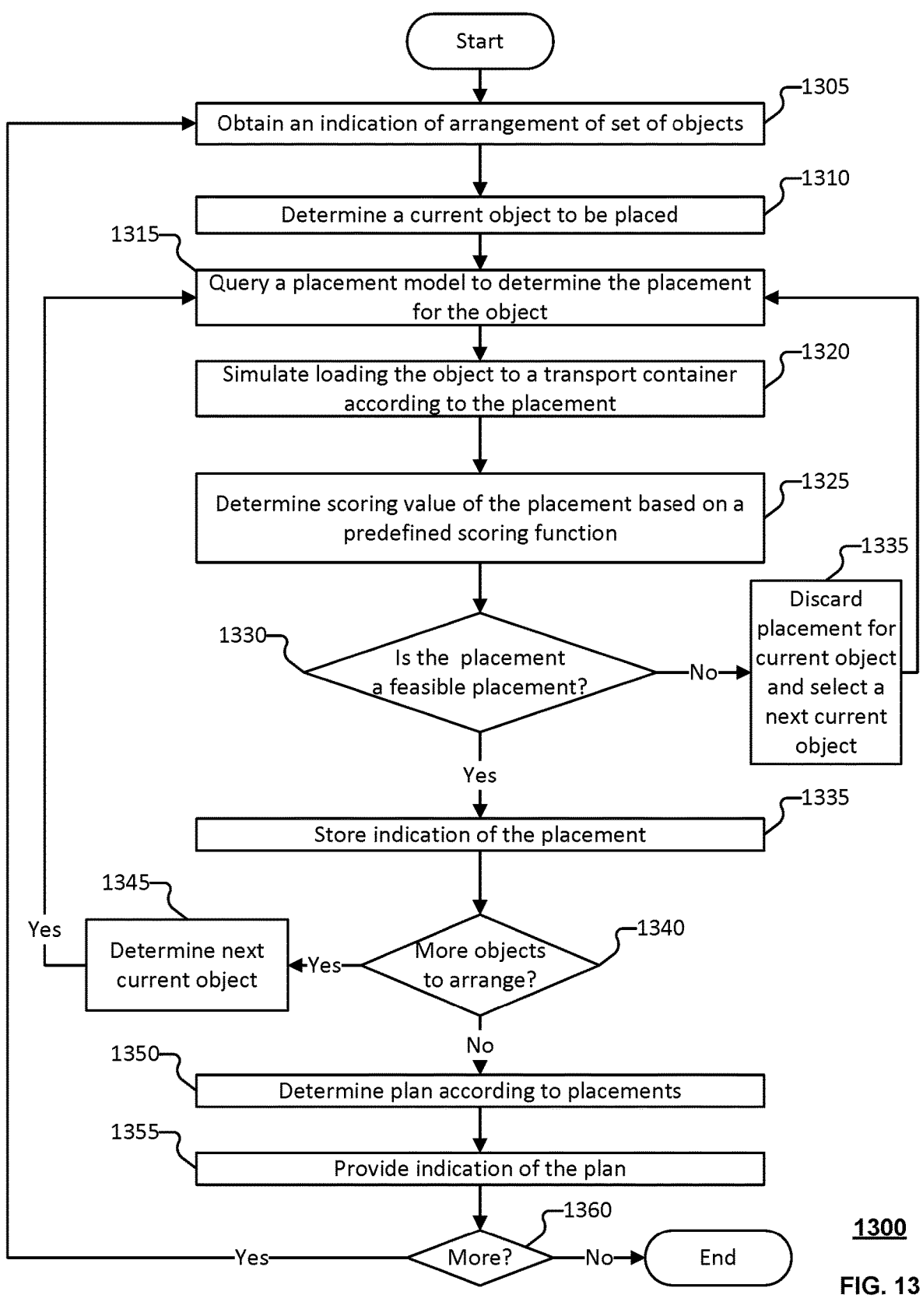
FIG. 13 is a flow chart illustrating a process for planning a loading of a set of objects to a transport container according to various embodiments.

FIG. 13 is a flow chart illustrating a process for planning a loading of a set of objects to a transport container according to various embodiments. In some embodiments, process 1300 is implemented by system 100 of FIG. 1, or one or more servers such as in connection with providing a cloud service. In some embodiments, process 1300 is implemented by the placement module. For example, the system (e.g., the model for planning the loading of objects) calls the placement module to invoke process 1300. As an example, process 1300 is invoked by 1210 of process 1200.

At 1304, an indication of the arrangement of the set of objects is obtained. For example, the system determines/obtains the best or optimal arrangement according to which a set of objects is to be loaded to the transport container. At 1310, a current object to be placed is determined. The current object may be the next object to be placed. At 1315, a placement model is queried to determine a placement for the object. At 1320, the loading of the object to the transport container is simulated based at least in part on the placement. At 1325, a scoring value of the placement is determined based at least in part on a predetermined scoring function. For example, the system evaluates the simulated loading. At 1330, the system determines whether the placement is a feasible placement. For example, the system determines whether a scoring value associated with the placement exceeds a predefined scoring threshold. As another example, the system determines whether the placement results in a stability criterion being violated. In response to determining that the placement is not feasible at 1330, process 1300 proceeds to 1335 at which the placement is discarded for the current object and a next current object is determined. In some embodiments, selecting the next current object for which a placement is to be evaluated correspond to selecting the same object and simulating a different placement. In response to selecting the next current object, process 1300 returns to 1315. Thereafter, process 1300 iterates over 1315 to 1330 until a feasible placement is determined. In response to determining that the placement is feasible at 1330, process 1300 proceeds to 1335 at which an indication of the placement is stored. For example, information pertaining to the placement is stored in a list of feasible placements. At 1340, the system determines whether more objects are to be arranged. In response to determining that more objects among the set of objects are to be arranged at 1340, process 1300 proceeds to 1345 at which a next current object is determined/selected. Thereafter, process 1300 returns to 1315 and process 1300 iterates over 1315 to 1340 until no further objects exist in the set of objects for which an arrangement/placement is to be determined. At 1350, the system determines a plan according to the feasible placements. For example, the system determines a plan according to which the robotic system is to load the set of objects according to the determined arrangement. At 1355, an indication of the plan is provided.

At 1360, a determination is made as to whether process 1300 is complete. In some embodiments, process 1300 is determined to be complete in response to a determination that no further plans for loading objects into the transport container are to be determined, the system receives confirmation that a robotic system configured to load objects to a transport container receives the arrangement, the system receives an indication that the robotic system has completed loading the set of objects to the transport container(s), an administrator indicates that process 1300 is to be paused or stopped, etc. In response to a determination that process 1300 is complete, process 1300 ends. In response to a determination that process 1300 is not complete, process 1300 returns to 1305.

Although the description of the examples illustrated in FIGS. 6-13 is provided in the context of loading a set of objects to a transport container, according to various embodiments, similar processes may be implemented in the context of unloading a set of objects to a transport container.

Figure 14:
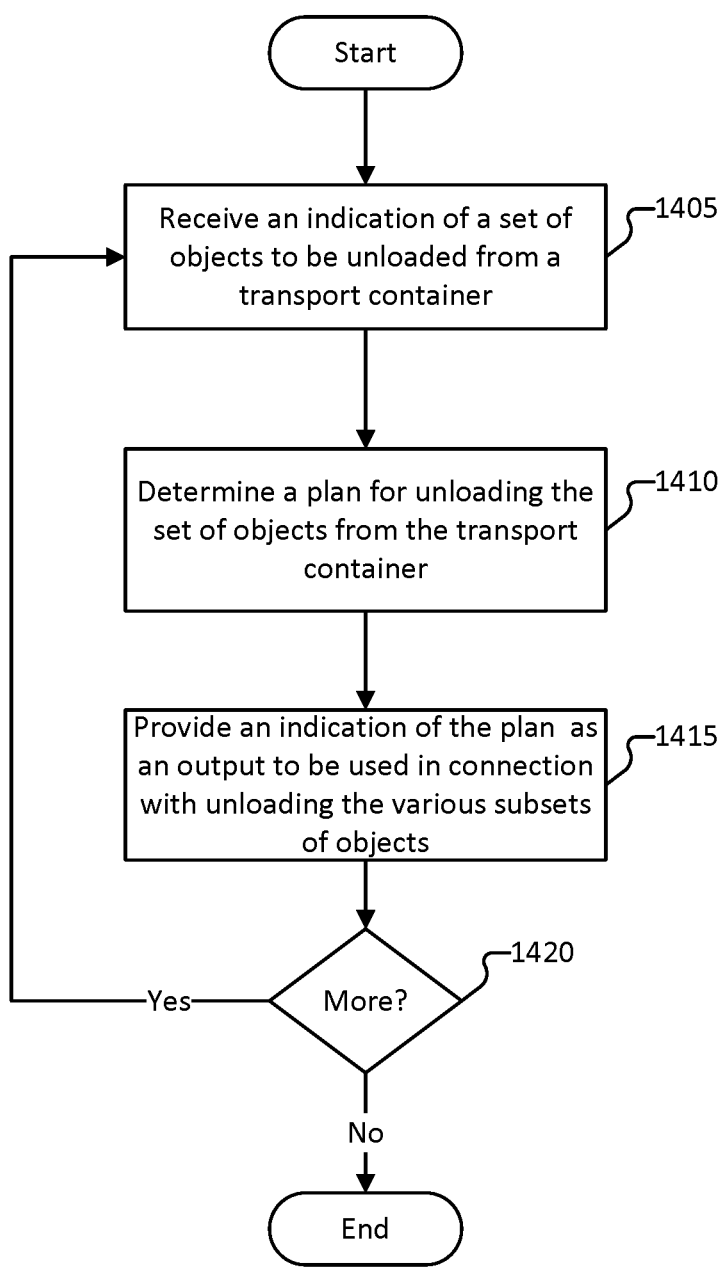
FIG. 14 is a flow chart illustrating a process for determining a plan for unloading a set of objects from a transport container according to various embodiments.

FIG. 14 is a flow chart illustrating a process for determining a plan for unloading a set of objects from a transport container according to various embodiments. In some embodiments, process 1400 is implemented by system 100 of FIG. 1, or one or more servers such as in connection with providing a cloud service. In some embodiments, process 1400 is implemented by the placement module. For example, the system (e.g., the model for planning the loading of objects) calls the placement module to invoke process 1400.

In some embodiments the unloading the set of objects from the transport container is similar to a reverse order of the loading of the set of objects. For example, the system determines a next object to unload, or a sequence of objects to unload, based on an impact to the stability of the objects within the transport container upon removal of the object(s).

At 1405, an indication of a set of objects to be unloaded from a transport container is received. At 1410, a plan for unloading the set of objects to the transport container is determined. At 1415, an indication of the plan is provided as an output to be used in connection with unloading the set of objects. At 1420, a determination is made as to whether process 1400 is complete. In some embodiments, process 1400 is determined to be complete in response a determination that no further plans for unloading objects into the transport container are to be determined, the system receives confirmation that a robotic system configured to unload objects to a transport container has received the plan, the system receives an indication that the robotic system has completed unloading the set of objects to the transport container(s), an administrator indicates that process 1400 is to be paused or stopped, etc. In response to a determination that process 1400 is complete, process 1400 ends. In response to a determination that process 1400 is not complete, process 1400 returns to 1405.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An object sequencing system for determining an arrangement of a set of objects for loading to a transport container, comprising:

a processor configured to:

receive an indication of the set of objects to be loaded into the transport container for transport from a source location to a destination location;

determine, based at least in part on object information corresponding to the set of objects, an arrangement of the set of objects loaded into the transport container according to a stability model, wherein:

the stability model optimizes a number of T junctions formed at interfaces among objects loaded into the transport container; and a T junction is formed at an interface among three objects when a first object is placed to partly rest on a second object and partly rest on a third object; and provide the arrangement of the set of objects to a robotic system to implement in connection with loading the set of objects to the transport container; and a memory configured to store the object information.

2. The object sequencing system of claim 1, further comprising:

one or more sensors configured to obtain information indicative of one or more object attributes for the set of objects; and wherein the one or more object attributes being stored in the object information.

3. The object sequencing system of claim 1, wherein object information comprises one or more object attributes.

4. The object sequencing system of claim 3, wherein the one or more object attributes include one or more of a shape, a mass, a material, a moment of inertia, a rigidity, an object size, an object dimension, an object weight, a type of packaging, an object identifier.

5. The object sequencing system of claim 1, wherein determining the arrangement according to the stability model includes selecting an arrangement based on a scoring function according to which T junctions have a more favorable scoring value than vertically aligned stacks of objects.

6. The object sequencing system of claim 1, wherein determining the arrangement according to the stability model includes simulating a packing of the set of objects according to a particular arrangement and predicting a stability of the objects packed according to the particular arrangement.

7. The object sequencing system of claim 1, further comprising:

one or more sensors configured to obtain information pertaining to a state of a workspace, the one or more sensors including a vision system or force-based sensors.

8. The object sequencing system of claim 7, wherein using the arrangement of the set of objects in connection with loading the set of objects to the transport container includes: iteratively performing: (i) operation of a robotic arm to pack a particular object in the set of objects according to the arrangement, (ii) obtaining sensor information from the one or more sensors after placement of the particular object, (iii) determining whether a current configuration of the set of objects satisfies a stability constraint, and (iv) perform an active measure to update the current configuration to correct detected instabilities in the event that the current configuration of the set of objects does not satisfy the stability constraint.

9. The object sequencing system of claim 1, wherein arrangement includes an indication of a sequence in which the set of objects are loaded to the transport container.

10. The object sequencing system of claim 9, wherein loading the set of objects according to the sequence includes (i) operating a robot to pack a layer of objects at a deepest point of the transport container, (ii) operating the robot to move towards an opening in the transport container, (iii) operating the robot to pack a successive layer of objects, wherein at each successive layer the robot loads objects along a first wall and a second wall of the transport container before loading objects between the objects loaded at the walls.

11. The object sequencing system of claim 10, wherein loading objects between objects loaded at the walls includes using robotic arms to apply a force to hold objects against the walls, and using a robot to load objects to the inside between the objects at the wall.

12. The object sequencing system of claim 1, wherein the one or more processors are further configured to:

determine to unload the transport container;

capture an image of the transport container;

create a segmented view of a workspace comprising the transport container;

determine a plan to unload a set of objects; and control a robot to unload the set of objects according to the plan.

13. The object sequencing system of claim 12, wherein the plan is determined based on predicting a stability of at least a subset of the objects in the transport container during unloading.

14. The object sequencing system of claim 12, wherein determining the plan to unload the set of objects comprises performing an evaluation of one or more plans to unload the set of objects, the evaluation of the one or more plans comprises:

simulate removing a first item;

computing an expected stability of a remaining set of objects loaded in the transport container;

comparing the expected to a predefined stability threshold; and if the expected stability is determined to be less than the predefined stability threshold, determine to remove a different item before removing the first item.

15. The object sequencing system of claim 14, wherein the evaluation of the one or more plans includes iteratively evaluating different plans for unloading the set of objects until stability for unloading of objects from the set of objects associated with a plan is determined to satisfy the predefined stability threshold.

16. The object sequencing system of claim 12, wherein unloading the set of objects includes using one or more robotic arms to apply a force to one or more other objects in the transport container while the robot is removing a particular object.

17. A method for determining an arrangement of a set of objects for loading to a transport container, comprising:

receiving, by one or more processors, an indication of the set of objects to be loaded into the transport container for transport from a source location to a destination location;

determining, based at least in part on object information corresponding to the set of objects, an arrangement of the set of objects loaded into the transport container according to a stability model, wherein:

the stability model optimizes a number of T junctions formed at interfaces among objects loaded into the transport container; and a T junction is formed at an interface among three objects when a first object is placed to partly rest on a second object and partly rest on a third object; and providing the arrangement of the set of objects to a robotic system to implement in connection with loading the set of objects to the transport container.

18. A computer program product embodied in a non-transitory computer readable storage medium and comprising computer instructions for:

receiving, by one or more processors, an indication of a set of objects to be loaded into a transport container for transport from a source location to a destination location;

determining, based at least in part on object information corresponding to the set of objects, an arrangement of the set of objects loaded into the transport container according to a stability model, wherein:

the stability model optimizes a number of T junctions formed at interfaces among objects loaded into the transport container; and a T junction is formed at an interface among three objects when a first object is placed to partly rest on a second object and partly rest on a third object; and providing the arrangement of the set of objects to a robotic system to implement in connection with loading the set of objects to the transport container.

* * * * *